United States Patent
Terahara et al.

(10) Patent No.: US 7,603,007 B2
(45) Date of Patent: Oct. 13, 2009

(54) QUADRATURE PHASE-SHIFT KEYING MODULATOR AND PHASE SHIFT AMOUNT CONTROLLING METHOD FOR THE SAME

(75) Inventors: Takafumi Terahara, Kawasaki (JP); Takeshi Hoshida, Kawasaki (JP); Kentaro Nakamura, Kawasaki (JP); Yuichi Akiyama, Kawasaki (JP); Hiroki Ooi, Kawasaki (JP); Jens C. Rasmussen, Kawasaki (JP); Akira Miura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/234,931

(22) Filed: Sep. 22, 2008

(65) Prior Publication Data

US 2009/0047028 A1 Feb. 19, 2009

Related U.S. Application Data

(63) Continuation of application No. PCT/JP2006/306870, filed on Mar. 31, 2006.

(51) Int. Cl.
*G02B 6/28* (2006.01)
(52) U.S. Cl. .................... 385/24; 385/15; 398/182; 398/183; 398/188
(58) Field of Classification Search .................. 385/15, 385/24; 398/182, 183, 188
See application file for complete search history.

(56) References Cited

U.S. PATENT DOCUMENTS

| 6,924,894 | B2 * | 8/2005 | Hoult et al. ............ 356/477 |
| 7,511,662 | B2 * | 3/2009 | Mathews et al. ....... 342/357.14 |
| 2004/0081470 | A1 | 4/2004 | Griffin |
| 2007/0019968 | A1 | 1/2007 | Hashimoto et al. |

FOREIGN PATENT DOCUMENTS

| WO | WO 03/049333 | 6/2003 |
| WO | WO 2004/088397 | 10/2004 |

OTHER PUBLICATIONS

International Search Report mailed Jun. 20, 2006, for International Application No. PCT/JP2006/306870.

* cited by examiner

*Primary Examiner*—Jennifer Doan
(74) *Attorney, Agent, or Firm*—Staas & Halsey LLP

(57) ABSTRACT

The improved quadrature phase shift keying modulator has a structure such that the average light output power of phase-shift keying modulation light output from the combining unit is changed according to the phase difference between the first and the second optical signal after being combined by means of applying driving signals different in eye crossing percentage by the first modulator and the second modulator, respectively, and has a power monitor monitoring the average light output power of quadrature phase-shift keying modulated light and a phase shift controlling unit which performs feedback control of the phase shift amount in the phase shifting unit based on the average light output power monitored by the power monitor.

10 Claims, 18 Drawing Sheets

OUTPUT EYE PATTERN AT INPUTTING OF NRZ SIGNAL

AMPLIFIER OUTPUT WAVEFORM

THIS PART IS OBTAINED AS OUTPUT WAVEFORM

AMPLIFIER INPUT WAVEFORM

QUADRATURE PHASE-SHIFT KEYING MODULATOR AND PHASE SHIFT AMOUNT CONTROLLING METHOD FOR THE SAME

This application is a continuation application, filed under 35 USC 111(a), of International Application PCT/JP2006/306870, filed Mar. 31, 2006.

TECHNICAL FIELD

The present invention relates to a quadrature phase-shift keying modulator suitable for use in an optical communication system and a phase shift amount controlling method for the same.

BACKGROUND ART

Recently, a demand for introduction of a next generation 40 Gbit/s optical transmission system has been increased, and in addition to this, a transmission distance and a frequency use efficiency equivalent to a 10 Gbit/s system are desired. As a means for satisfying the above demand and desire, researches and developments of the DPSK (Differential Phase Shift Keying) modulation scheme have been actively performed, since the DPSK modulation scheme is superior to the NRZ (Non Return to Zero) modulation scheme having been previously applied to systems of 10 Gb/s in optical signal-to-noise ratio (OSNR) tolerance and non-linearity tolerance. Further, in addition to the above-mentioned modulation scheme, researches and developments of other phase modulation schemes such as DQPSK (Differential Quadrature Phase-Shift Keying) modulation featured in its narrow spectrum (high-frequency use efficiency) have also been actively performed.

In particular, the DQPSK modulation scheme transmits two phase-modulated digital signals which are at the same time using signal light of one frequency. Since this scheme needs a pulse repetition frequency only a half (for example, 20 GHz) of the data speed (for example, 40 Gbit/s) of transmission data, a signal spectrum width becomes half of that of the previous NRZ modulation scheme or the like, so that the DQPSK modulation scheme is superior to the previous NRZ modulation scheme or the like in a frequency use efficiency, wave dispersion tolerance, device transmission characteristics, and so on. For the above reason, in the field of optical transmission systems, application of the present modulation scheme to high-speed transmission systems, in particular, systems in which the data speed exceeds 40 Gbit/s, has been studied actively.

FIG. 17 is a diagram illustrating a common type of DQPSK modulator 100. A technique for transmitting data through modulation/demodulation in the DQPSK scheme is also described in, for example, the following patent document 1.

The DQPSK modulator 100 shown in FIG. 17 is provided for, for example, an optical transmitter that transmits an optical signal in an optical transmission system to modulate a data signal into an optical signal with the DQPSK modulation scheme, and includes not only a transmission data processor 101, amplifiers 102-1 and 102-2, a CW (Continuous Wave) light source 103, a π/2 phase shifter 104, and two Mach-Zehnder phase modulators 105-1 and 105-2, but also an MZM interferometer 106 that makes phase modulation signals from the phase modulator 105-1 and 105-2 interfere, which phase modulation signals are given a phase difference of π/2.

That is, the MZM interferometer 106 is connected thereto with a CW light source 103 on the input end, and there formed are phase modulators 105-1 and 105-2 at parts of bifurcated waveguides, respectively. Hereinafter, a Mach-Zehnder waveguide operating as the MZM interferometer 106 will sometimes be referred to as a parent MZ (Mach-Zehnder) waveguide, and a Mach-Zehnder waveguide operating as a phase modulator formed at a bifurcated waveguide part of the parent waveguide will sometimes be referred to as a child MZ waveguide.

Here, the transmission data processor 101 has a function as a framer and an FEC encoder together with a function as a DQPSK precoder that performs coding processing in which difference information between the current code and the code previous thereto by one bit is reflected. A data signal output from this transmission data processor 101 is output as signals obtained by dividing coded data of, for example, approximately 40 Gbit/s into two series of coded data (data #1 and data #2) of 20 Gbit/s. Further, the amplifiers 102-1 and 102-2 each amplify the coded data (data #1 and data #2, respectively) and outputs the amplified data to the phase modulators 105-1 and 105-2 as driving signals.

Further, the CW light source 103 outputs continuous light. The continuous light output from the CW light source 103 is bifurcated by the split waveguide 106a forming the MZM interferometer 106. The I (In-phase) arm, one of the bifurcated waveguides, is input to the phase modulator 105-1; the Q (Quadrature-phase) arm, the other of the waveguides, is input to the phase modulator 105-2. Each of the phase modulators 105-1 and 105-2 has a structure basically similar to that of a common BPSK (Binary phase-shift Keying) modulator.

Here, the phase modulator 105-1 modulates continuous light from the CW light source 103 with one of the series of coded data (data #1) from the transmission data processor 101 and outputs an optical signal which carries information on a binary light phase (0 rad or π rad). Further, the phase modulator 105-2 modulates continuous light from the CW light source 103 with the other of the series of coded data (data #2) from the transmission data processor 101. Then, the π/2 phase shifter 104 phase-shifts the thus modulated optical signal by φ=π/2, thereby outputting the phase-shifted light as an optical signal which carries information on a binary light phase (π/2 rad or 3π/2 rad).

Then, the modulated light from the phase modulators 105-1 and 105-2 are combined by the combining waveguide 106b forming the MZM interferometer 106 and then output. That is, combination of modulated light from the phase modulators 105-1 and 105-2 makes it possible to output an optical signal whose intensity is fixed but which carries information on a quadrature (π/4, 3π/4, 5π/4, and 7π/4) light phase, that is, a DQPSK modulated optical signal.

In this manner, in DQPSK modulation, light transmission is performed with a 4-ary symbol of π/4(0,0), 3π/4 (1,0), 5π/4 (1,1), and 7π/4 (0,1) in which data "0" and "1" are modulated into phase 0 and phase π, respectively, by means of shifting two series of digital signals by π/2, thereby making the two series of digital signals interfere.

Here, the π/2 phase shifter 104 also performs phase shifting of input signal light with a voltage applied through an electrode, and a voltage (bias voltage) applied in the π/2 phase shifter 104 and the phase shift amount of the optical signal has a one-to-one correspondence relationship as indicated by A in FIG. 18. Thus, the π/2 phase shifter 104 shown in FIG. 17 supplies a fixed voltage V1 with which an optical signal from the phase modulator 105-2 is distorted by π/2.

However, the DQPSK modulator 100 described above with reference to FIG. 17 has a problem of an occurrence of a deviation of α from π/2 that is an ideal phase difference between a phase modulation signal component (see B in FIG.

19) from the I arm side and a phase modulation signal component (see C in FIG. 19) from the Q arm side, in the phase modulated optical signal obtained from CW light (see A in FIG. 19) due to production tolerance of the MZM interferometer 106, change in ambient temperature, and other temporal factors (see D in FIG. 19).

In other words, since a correspondence relationship A shown in FIG. 18 changes as indicated by A' due to the above described factors, it becomes impossible to make the optical signals from the phase modulators 105-1 and 105-2 have a predetermined phase difference therebetween at the time they pass through the combining waveguide 106b only by means of giving a fixed voltage V1.

As a result, a phase difference of $\pi/2$ is not present between 4-ary symbols, and a peak power between symbols changes (see D in FIG. 19), such factors thereby causing deterioration of signal quality.

Hence, in order to suppress such deterioration of signal quality, it is necessary to stabilize a phase difference between the above described phase modulated signal component from the I arm side and a phase modulation signal component from the Q arm side into an appropriate value. For realizing such phase difference stabilization, it is considered to monitor the phase difference and feedback the bias voltage in the $\pi/2$ phase shifter 104.

The following patent document 2 discloses the following technique for stabilizing the above described phase difference into an appropriate value. Synchronous detection using a pilot signal from an optical signal monitored by use of either a two-photon absorption detection element or a fast linear photodiode is executed, and feedback control of a bias voltage in the $\pi/2$ phase shifter 104 is performed in such a manner that a DC component resulting from a phase deviation from $\pi/2$ is eliminated.

Patent Document 1: Pamphlet of International Publication No. 03/049333

Patent Document 2: US Patent Application Publication No. 2004/0081470

DISCLOSURE OF THE INVENTION

Issue(s) to be Solved by the Invention

However, the technique disclosed in the above patent document 2 has an issue of necessity of using expensive elements such as a two-photon absorption detecting element for detecting an instantaneous peak power of DQPSK modulated light for each symbol, which increases the cost of the DQPSK modulator.

In view of such an issue to be solved, the present invention is originated. An object of the present invention is realizing feedback control of the phase shift amount such that two combined differential phase-shift keying modulated light components have an appropriate phase difference while applying inexpensive elements whose response speed is sufficiently lower than the bit rate in a differential quadrature phase-shift keying modulation.

Means to Solve the Issue(s)

In order to accomplish the above object, according to the present invention, as a generic feature, there provided is a quadrature phase shift keying modulator comprising: a first modulator which performs phase-shift keying modulation of input light with a first driving signal that is based on first data; a second modulator which performs phase-shift keying modulation of input light with a second driving signal that is a driving signal based on second data and is different from the first driving signal in eye crossing percentage; a phase shifting unit which performs phase shift processing in such a manner that a second optical signal, which is phase-shift keying modulated with a first optical signal, being phase-shift keying modulated by the first modulator, and a second optical signal, which is phase-shift keying modulated by the second modulator, form a phase difference of $\pi/2$ therebetween; and a combining unit which combines the first optical signal and the second optical signal, which are subjected to the phase shift processing performed by the phase shifting unit, and hereby outputs quadrature phase-shift keying modulated light, which quadrature phase-shift keying modulator is constructed in such a manner that an average light output power of the quadrature phase-shift keying modulation light output from the combining unit changes in accordance with a phase difference between a component of the first optical signal and a component of the second optical signal after being combined by the combining unit by means of applying driving signals different in eye crossing percentage by the first modulator and the second modulator, respectively, and the quadrature phase shift keying modulator further comprises: a power monitor which monitors an average light output power of the quadrature phase-shift keying modulation light output from the combining unit; and a phase shift controlling unit which performs feedback control of the phase shift amount in the phase shifting unit based on the average light output power monitored by the power monitor.

As a preferred feature, the phase shift controlling unit includes: a low-frequency signal generating unit which generates a low-frequency signal; a bias supplying unit which sets a phase control voltage signal for use in the phase shift processing performed by the phase shifting unit and superimposes the low-frequency signal generated by the low-frequency signal generating unit to the phase control voltage signal and supplies the phase shifting unit with the resultantly obtained signal as the bias voltage signal; a frequency component extracting unit which extracts a frequency component derived from the low-frequency signal in the bias signal, which frequency component is contained in the average light output power monitored by the power monitor; and a bias controlling unit which controls the phase control voltage signal set by the bias supplying unit based on the frequency component extracted by the frequency component extracting unit.

As another preferred feature, the eye crossing percentage of each of the driving signals in the first modulator and the second modulator is set in such a manner that a frequency component of the low-frequency signal, which is a frequency component derived from the low-frequency signal contained in the average light output power, increases as a phase difference between the first optical signal and the second optical signal approaches to $\pi/2$, and the frequency component extracting unit extracts a frequency component of the low-frequency signal as a frequency component derived from the low-frequency signal contained in the bias signal, and the bias controlling unit controls the phase control voltage signal in such a manner that the frequency component of the low-frequency signal extracted by the frequency component extracting unit becomes maximal.

As a yet another preferred feature, a eye crossing percentage of each of the driving signals in the first modulator and the second modulator is set in such a manner that a frequency component at the second harmonic frequency of the low-frequency signal, which is a frequency component derived from the low-frequency signal contained in the average light output power, decreases as a phase difference between the first optical signal and the second optical signal approaches to $\pi/2$, and the frequency component extracting unit extracts a frequency component at the second harmonic frequency of the low-frequency signal as a frequency component derived from the low-frequency signal contained in the bias signal, and the phase control voltage controlling unit controls the phase control voltage signal in such a manner that a frequency component at the second harmonic frequency of the low-frequency signal extracted by the frequency component extracting unit becomes minimal.

As a still another preferred feature, the quadrature phase-shift keying modulator further comprises: a continuous light supplying unit which supplies the first modulator and the second modulator with continuous light, the first and second modulators each performing the differential phase modulation with the continuous light from the continuous light supplying unit as the input light and hereby outputting the first and the second optical signal.

As a further preferred feature, the first modulator includes: a first driving signal outputting unit which outputs the first driving signal; and a first phase modulating unit which performs phase-shift keying modulation of the input light by means of applying the first driving signal from the first driving signal outputting unit, and the second modulator includes: a second driving signal outputting unit which outputs the second driving signal; and a second phase modulating unit which performs phase-shift keying modulation of the input light by means of applying the second driving signal from the second driving signal outputting unit.

As a yet further preferred feature, the first driving signal outputting unit includes: a first reference value setting unit which sets a first reference value; and a first differential amplifier which obtains a signal component based on the first data with the first reference value as the center thereof and performs differential amplification of the obtained signal component and hereby outputs the first driving signal as a differential signal, and the second driving signal outputting unit includes: a second reference value setting unit which sets a second reference value; and a second differential amplifier which obtains a signal component based on the second data with the second reference value as the center thereof, and performs differential amplification of the signal component having been obtained, and hereby outputs the second driving signal as a differential signal, and the first and second reference value setting units set the first reference value and the second reference value so as to be different from each other.

As a still further preferred feature, the first reference value setting unit includes: a first average value circuit which calculates an average value of the first driving signal output from the first differential amplifier; and a first control circuit which performs setting control of the first reference value in such a manner that the first driving signal is stabilized to have a predetermined eye crossing percentage based on a calculation result obtained by the first average value circuit, and the second reference value setting unit includes: a second average value circuit which calculates an average value of the second driving signal output from the second differential amplifier; and a second control circuit which performs setting control of the second reference value in such a manner that the first driving signal is stabilized to have a predetermined eye crossing percentage, which is different from that of the first driving signal, based on a calculation result obtained by the second average value circuit.

As another preferred feature, the power monitor includes an opto-electric conversion element whose response speed is significantly lower than the bit rate of the first or the second data.

As another generic feature, there provided is a phase shift amount controlling method for a quadrature phase-shift keying modulator including: a first modulator which is operable to output a first optical signal obtained by means of phase-shift keying modulation of input light with application of a first driving signal thereto; a second modulator which is operable to output a second optical signal obtained by means of phase-shift keying modulation of input light with application of a second driving signal thereto; a phase shifting unit which performs phase shift processing in such a manner that the first optical signal and the second optical signal form a phase difference of $\pi/2$ therebetween; and a combining unit which combines the first optical signal and the second optical signal, which are subjected to the phase shift processing performed by the phase shifting unit and hereby outputs quadrature phase-shift keying modulation light, the method comprising: applying driving signals different in eye crossing percentage by the first modulator and the second modulator, respectively, and hereby changing an average light output power of phase-shift keying modulation light output from the combining unit in accordance with a phase difference between the first optical signal and the second optical signal formed by the phase shift processing; monitoring an average light output power of the phase-shift keying modulation light output from the combining unit; and performing feedback control of the phase shift amount in the phase shifting unit based on the monitored average light output power.

Effects of the Invention

As described above, according to the present invention, since it is possible to perform feedback controlling of the phase shift amount in the phase shift unit based on the monitored average light output power, there is an advantage that the differential quadrature phase shift keying modulator is capable of realizing feedback control of the phase shift amount that realizes an appropriate phase difference between the combined two differential phase-shift keying modulated light components, which operates as differential quadrature phase-shift keying modulated light, while applying an inexpensive optic-electric conversion element whose response speed is significantly lower than the bit rate.

Figure 7:
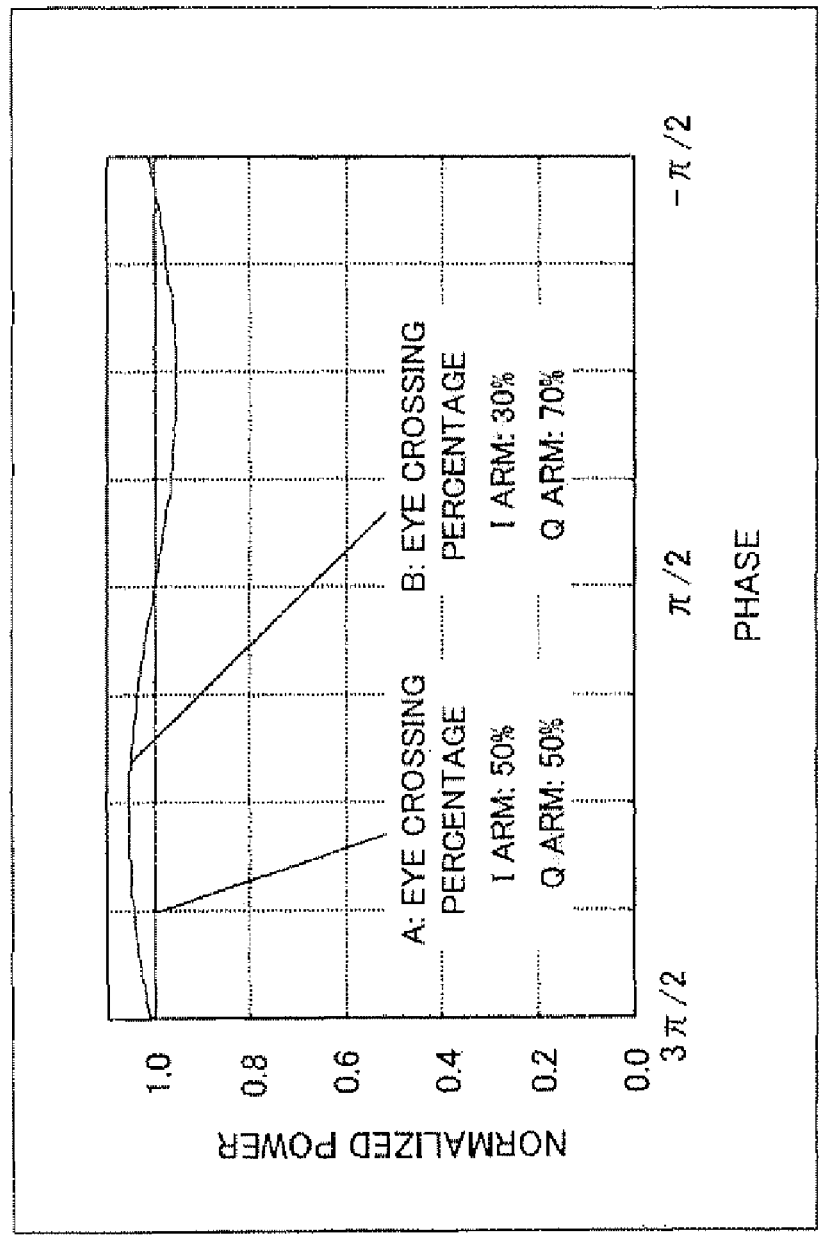
Figure 8:
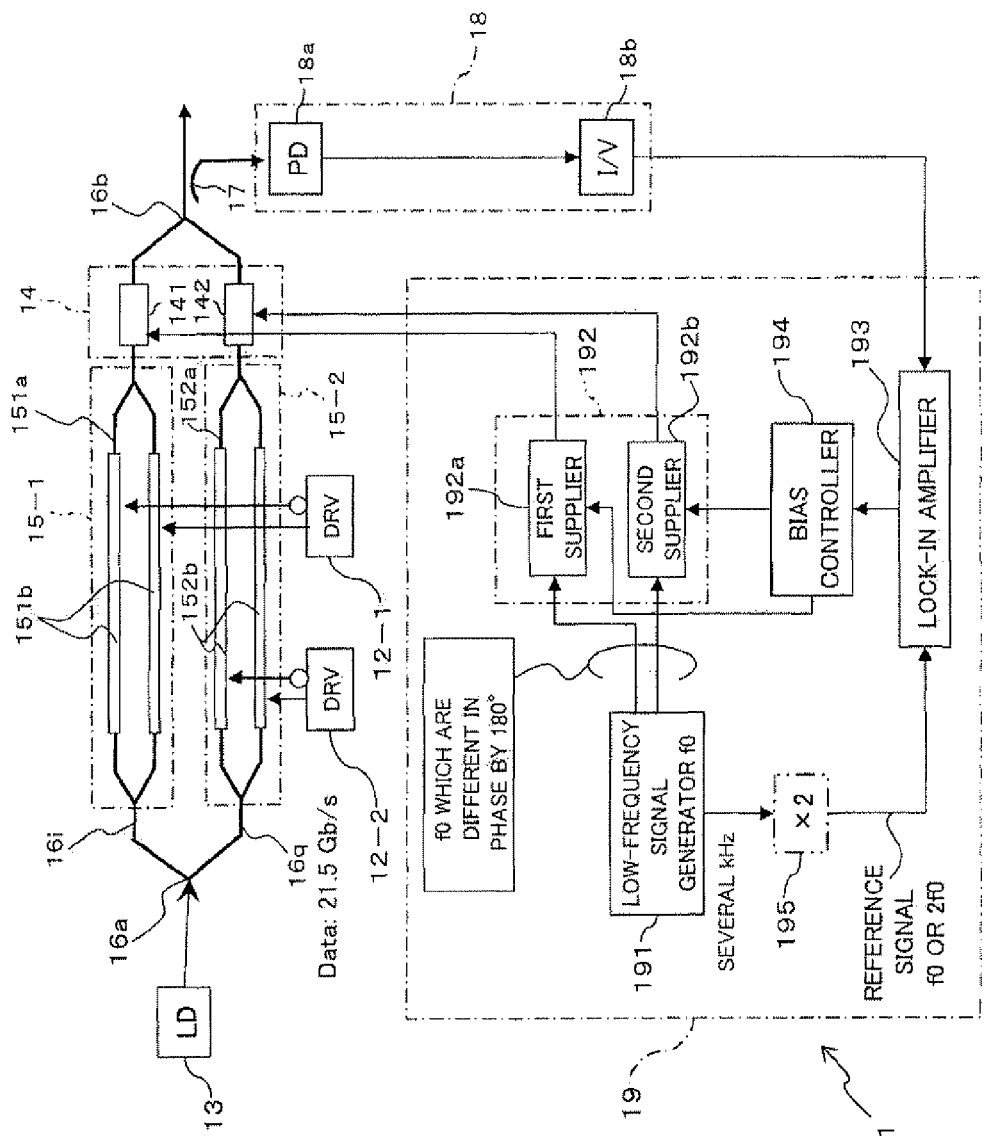
Figure 9:
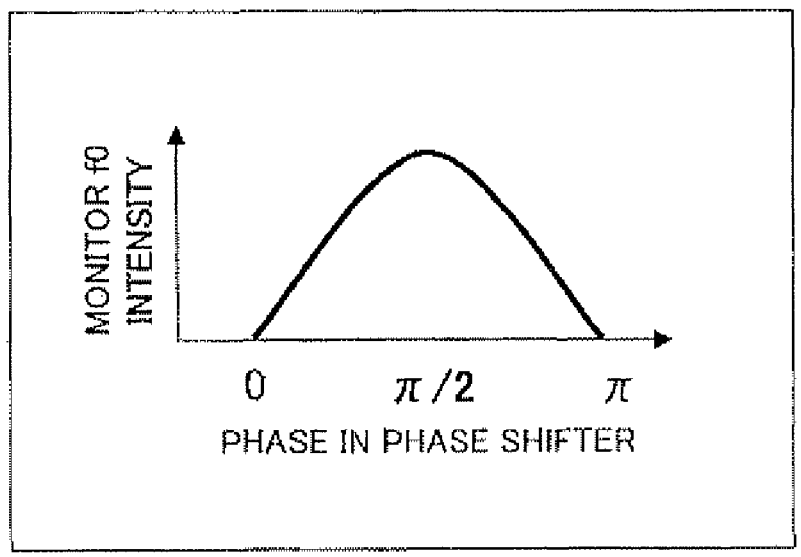
Figure 10:
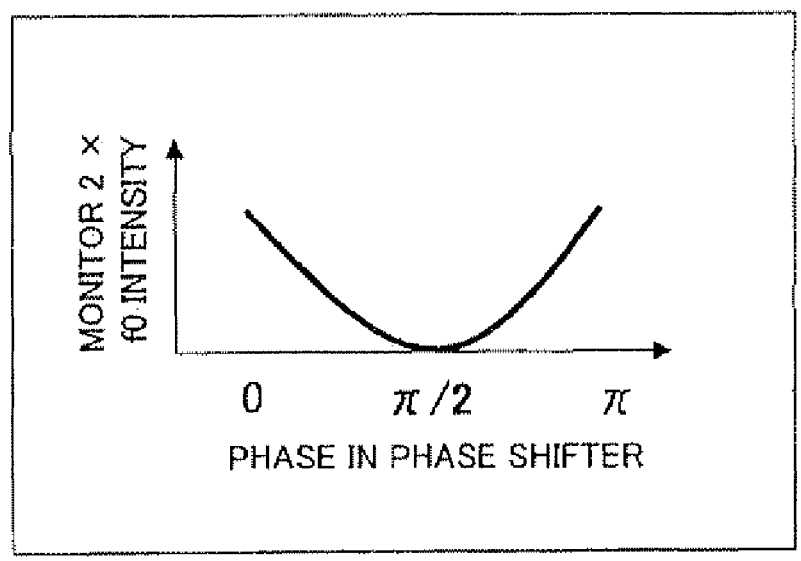
Figure 11:
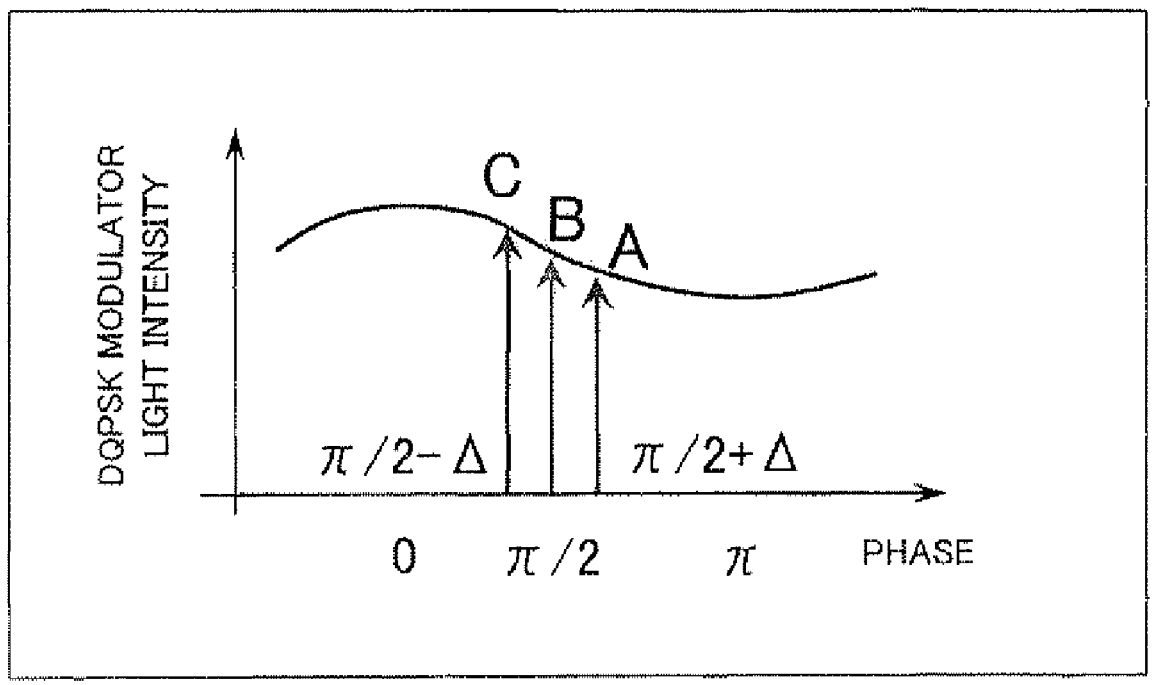
Figure 12:
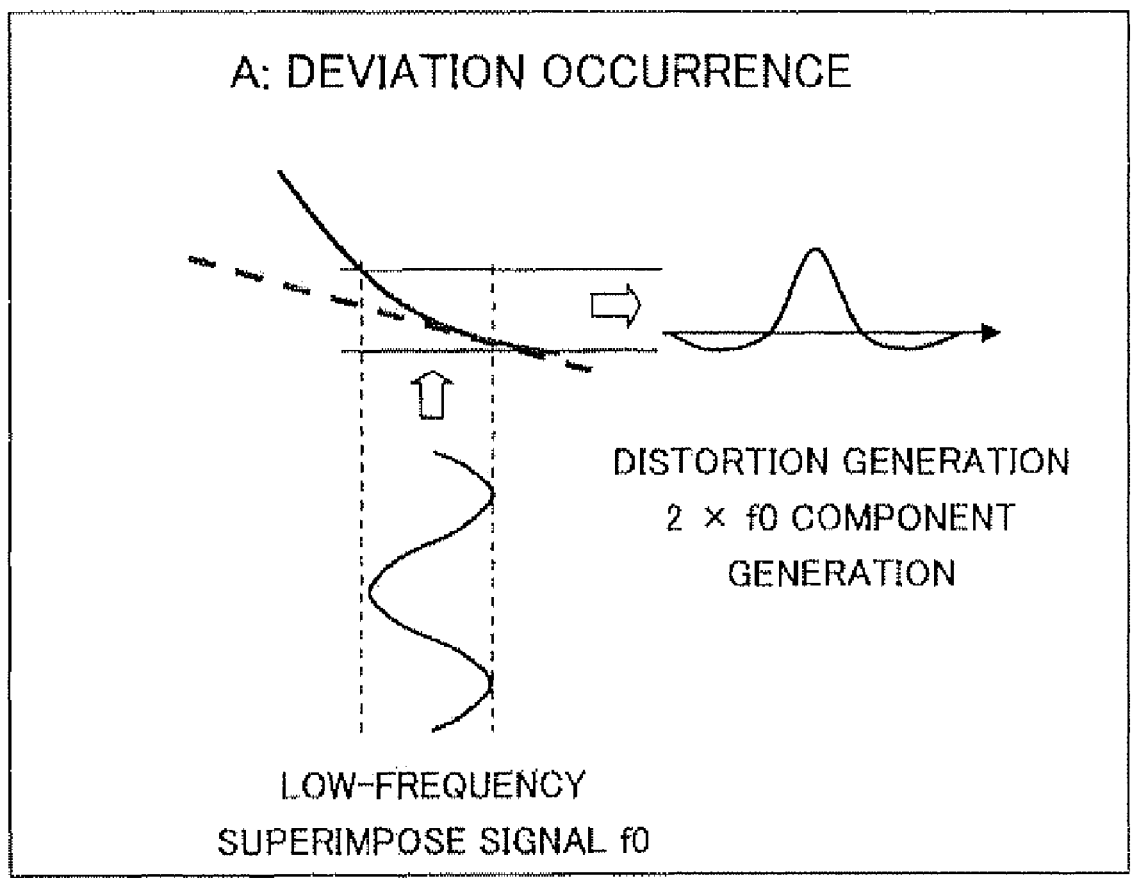
Figure 13:
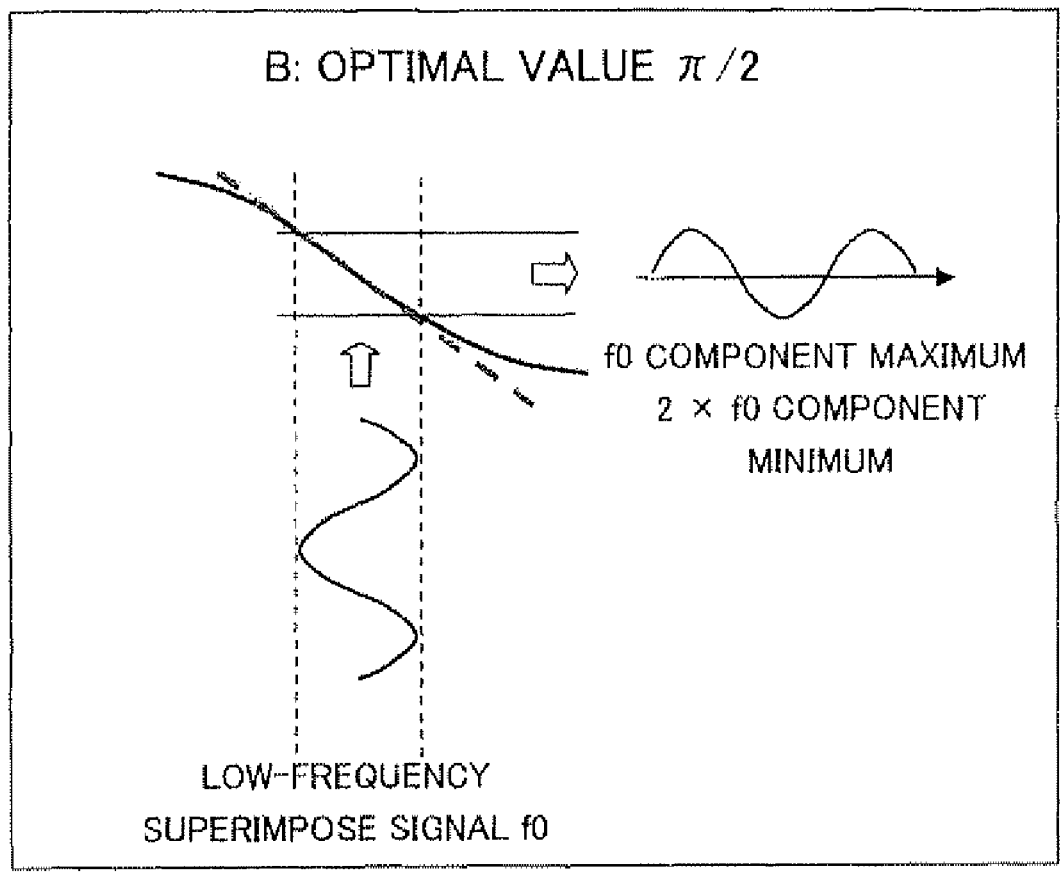
Figure 14:
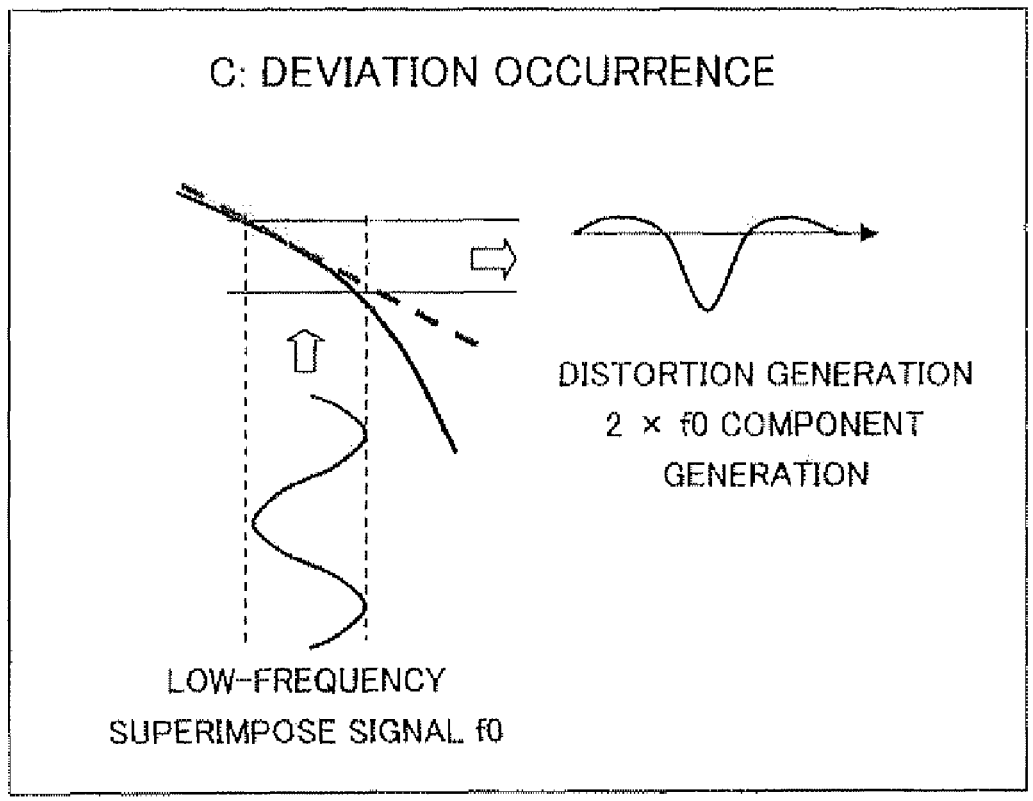
Figure 15:
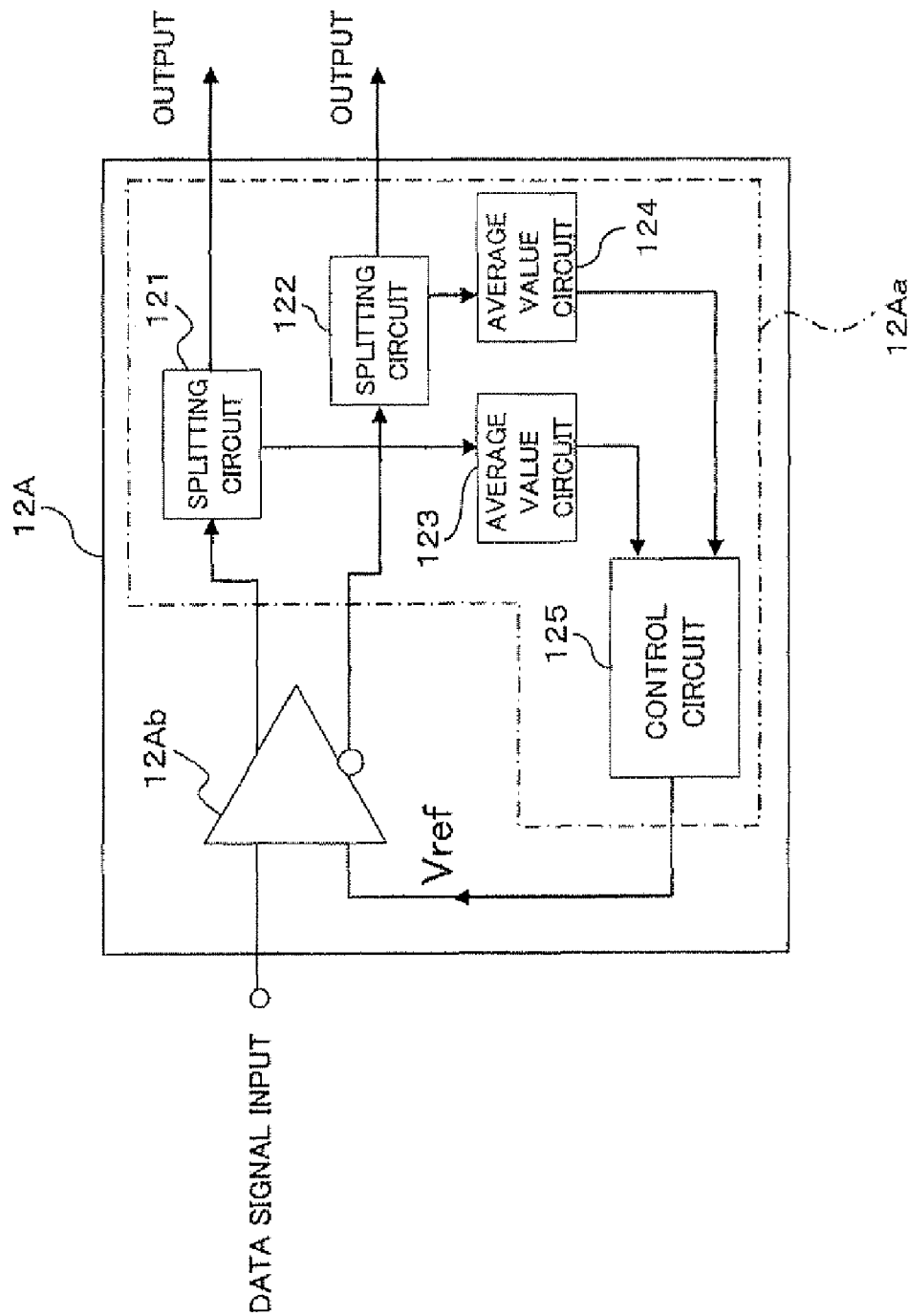
Figure 16:
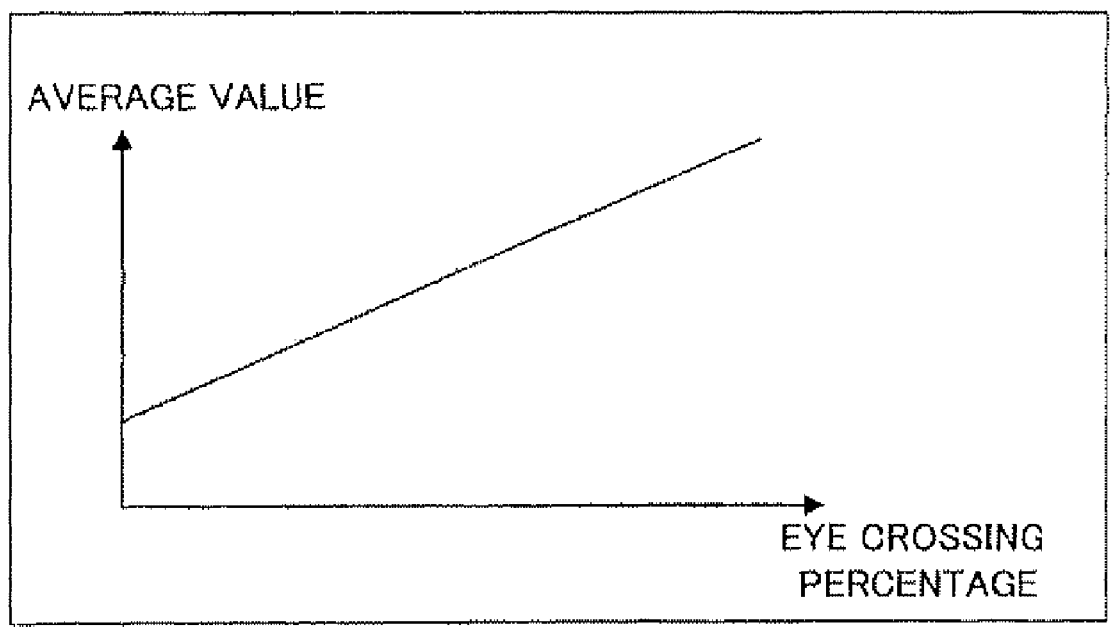
Figure 17:
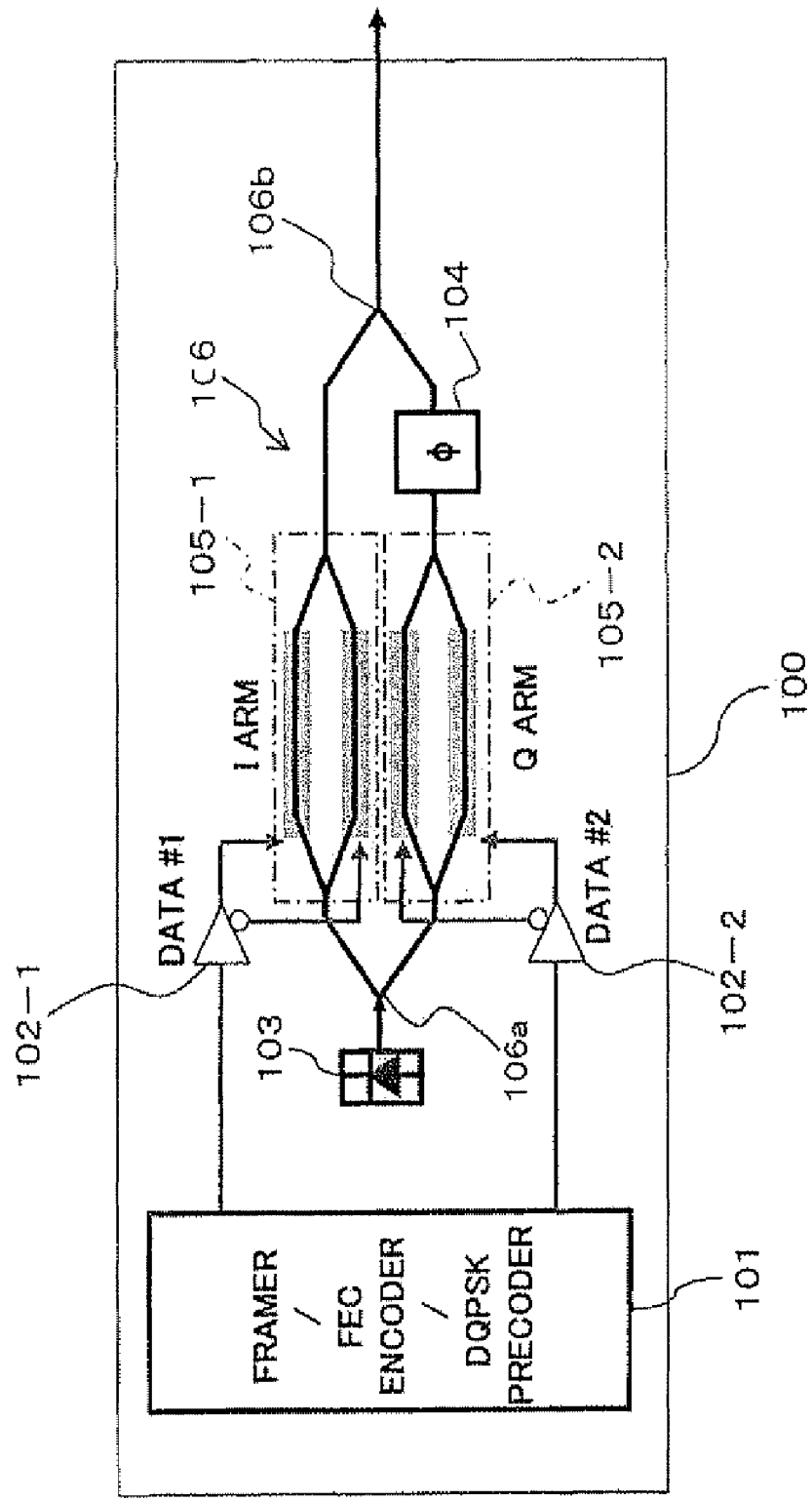
Figure 18:
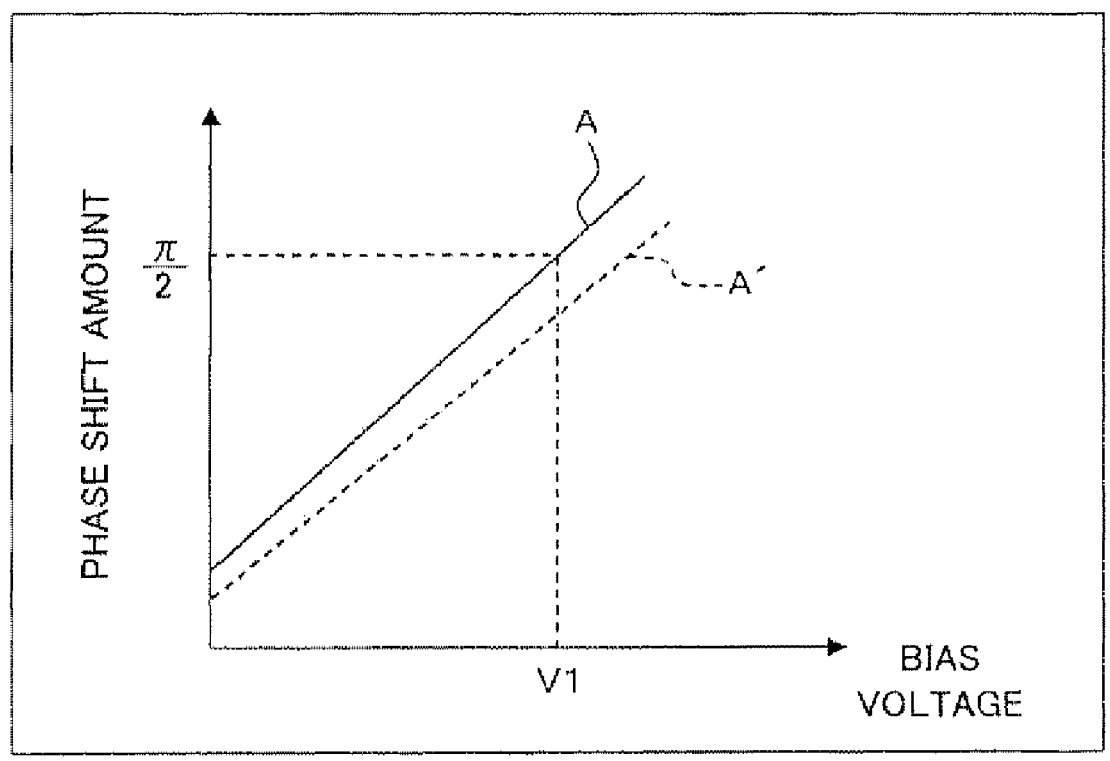
Figure 19:
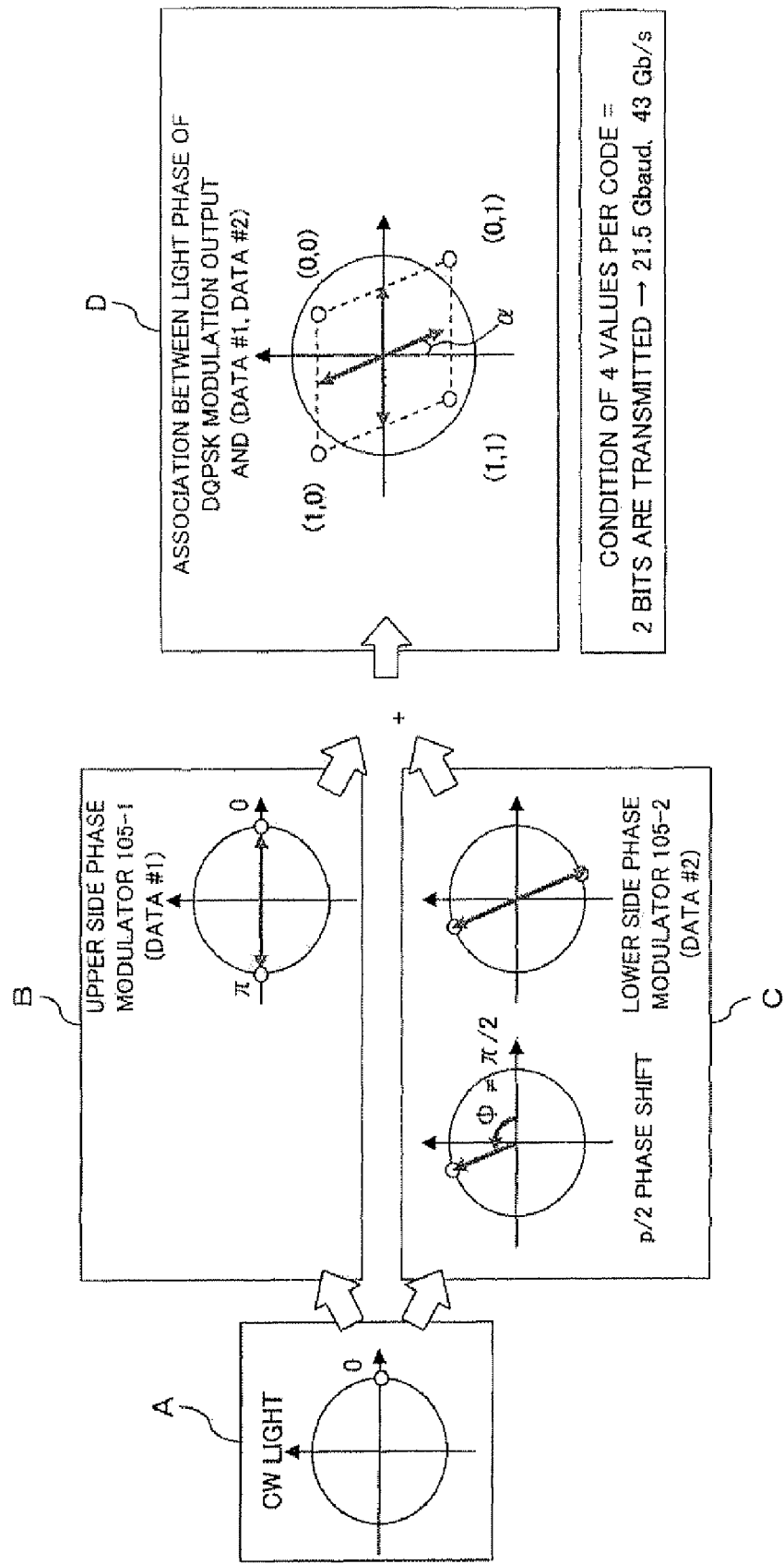

(a) through (c) of FIG. 2 each are diagrams for describing a fact that eye crossing percentages of a first driving signal and a second driving signal can be set by means of setting a first reference value and a second reference value;

(a) through (c) of FIG. 3 each are diagrams for describing a fact that eye crossing percentages of the first driving signal and the second driving signal can be set by means of setting the first reference value and the second reference value;

(a) through (c) of FIG. 4 each are diagrams for describing a fact that eye crossing percentages of the first driving signal and the second driving signal can be set by means of setting the first reference value and the second reference value;

(a) and (b) of FIG. 5 both are diagrams for describing eye crossing percentages each of which is set to the first and the second driving signal, respectively;

(a) and (b) of FIG. 6 both are diagrams for describing eye crossing percentages each of which is set to the first and the second driving signal, respectively;

FIG. 7 is a diagram for describing a fact that the average light output power of differential quadrature phase-shift keying modulated light output from a combining waveguide changes in accordance with the phase shift amount in a $\pi/2$ phase shifter by means of adding driving signals different in eye crossing percentage;

FIG. 8 is a diagram illustrating the DQPSK modulator according to one preferred embodiment with an attention paid to a feedback controller;

FIG. 9 is a diagram indicating change in a frequency f0 component from a lock-in amplifier in accordance with the phase shift amount in the $\pi/2$ phase shifter;

FIG. 10 is a diagram indicating change in a frequency 2f0 component from a lock-in amplifier in accordance with the phase shift amount in the $\pi/2$ phase shifter;

FIG. 11 is a diagram for describing a reason for which change in frequency f0 and 2f0 components in the lock-in amplifier in accordance with the phase shift amount in the $\pi/2$ phase shifter shows relationships in FIG. 9 and FIG. 10;

FIG. 12 is a diagram for describing a reason for which change in frequency f0 and 2f0 components in the lock-in amplifier in accordance with the phase shift amount in the $\pi/2$ phase shifter shows relationships shown in FIG. 9 and FIG. 10;

FIG. 13 is a diagram for describing a reason for which change in frequency f0 and 2f0 components in the lock-in amplifier in accordance with the phase shift amount in the $\pi/2$ phase shifter shows relationships shown in FIG. 9 and FIG. 10;

FIG. 14 is a diagram for describing a reason that change in frequency f0 and 2f0 components in the lock-in amplifier in accordance with the phase shift amount in the $\pi/2$ phase shifter shows relationships shown in FIG. 9 and FIG. 10;

FIG. 15 is a diagram illustrating a modified example of one preferred embodiment of the present invention;

FIG. 16 is a diagram for describing the modified example of one preferred embodiment of the present invention;

FIG. 17 is a diagram illustrating a common type of DQPSK modulator;

FIG. 18 is a diagram indicating a relationship between a voltage (bias voltage) applied to the $\pi/2$ phase shifter and the phase shift amount of an optical signal; and FIG. 19 is a diagram for describing an operation of the DQPSK modulator illustrated in FIG. 17.

DESCRIPTION OF REFERENCE CHARACTERS 1 and 100 . . . DQPSK modulator
2-1 . . . first modulator
2-2 . . . second modulator
11 and 101 . . . transmission data processor (transmission data processing unit)
12-1 . . . first driving signal outputting unit
12-2 . . . second driving signal outputting unit
12a . . . first reference value setting unit
12b . . . first differential amplifier
12c . . . second reference value setting unit
12d . . . second differential amplifier
12A . . . driving signal outputting unit
12Aa . . . reference value setting unit
12Ab . . . differential amplifier
13 and 103 . . . CW light source
14 and 104 . . . $\pi/2$ phase shifter ($\pi/2$ phase shifting unit)
15-1 . . . first phase modulator (first phase modulating unit)
15-2 . . . second phase modulator (second phase modulating unit)
16 and 106 . . . MZM interferometer
16a and 106a . . . split waveguide
16b and 106b . . . combining waveguide
16i . . . I arm waveguide
16q . . . Q arm waveguide
17 . . . optical coupler
18 . . . power monitor
18a . . . photodiode
18b . . . current/voltage converter
19 . . . feedback controller (feedback controlling unit)
102-1 and 102-2 . . . amplifier
105-1 and 105-2 . . . Mach-Zehnder phase modulator
121 and 122 . . . splitter circuit
123 and 124 . . . average value circuit
125 . . . control circuit
141 and 142 . . . electrode
151a and 152a . . . Mach-Zehnder waveguide
151b and 152b . . . electrode
191 . . . low-frequency signal generator (low-frequency signal generating unit)
192 . . . bias supplier (bias supplying unit)
192a and 192b . . . supplier (supplying unit)
193 . . . lock-in amplifier (frequency component extracting unit)
194 . . . bias controller

BEST MODE FOR CARRYING OUT THE INVENTION

An embodiment of the present invention will now be described with reference to the relevant accompanying drawings. Here, the embodiment of the present invention should by no means be limited to the following example of embodiment. Further, not only the objects of the present invention but also other technological issues, means to solve the issues, and their effects and benefits are clarified by the disclosure of the following embodiment.

[a1] One Preferred Embodiment of the Present Invention

Figure 1:
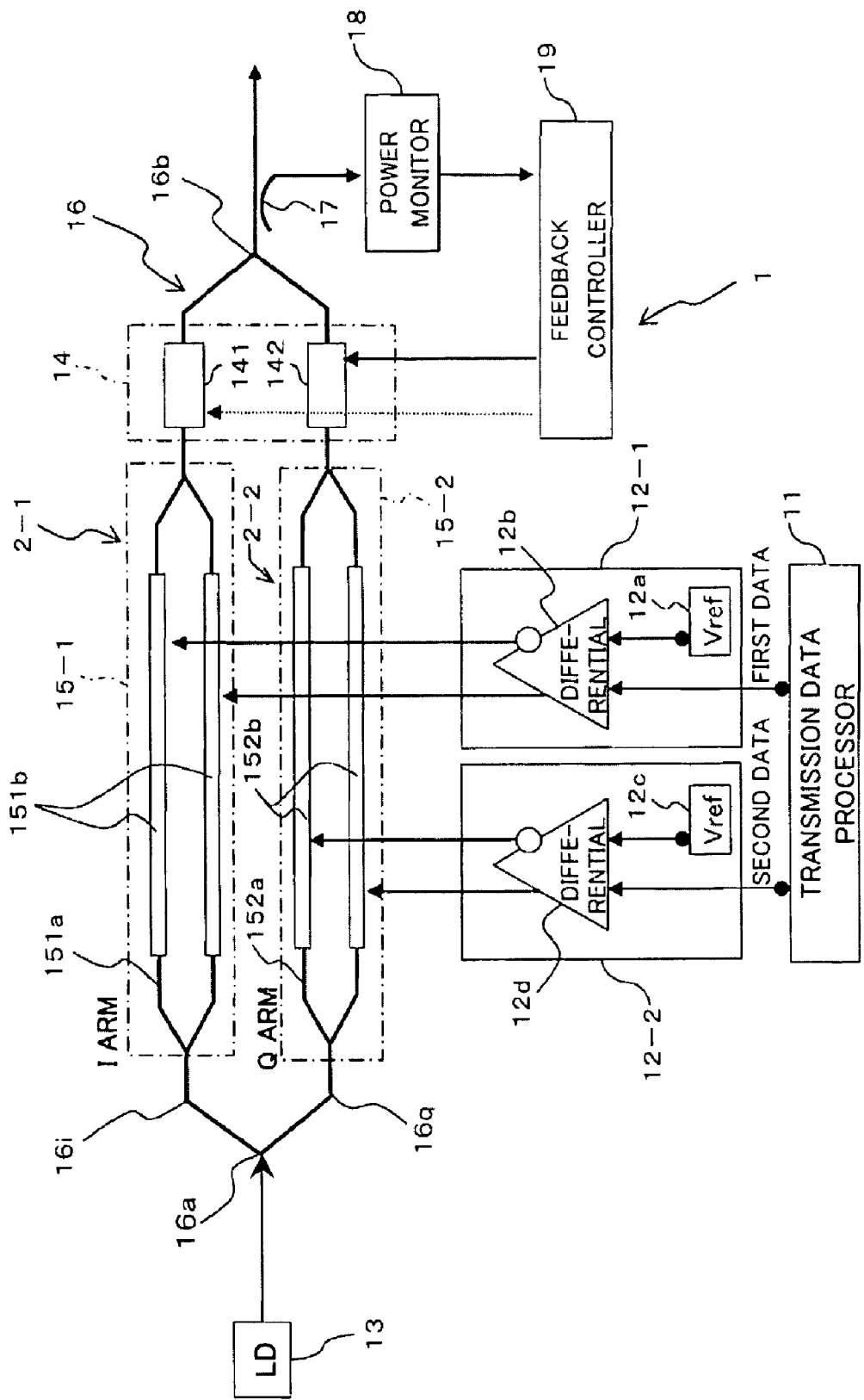
FIG. 1 is a diagram illustrating a DQPSK modulator according to one preferred embodiment of the present invention.

FIG. 1 is a diagram illustrating a DQPSK modulator according to one preferred embodiment of the present invention. The DQPSK modulator 1, similar to that which has already been described with reference to FIG. 17, is provided for, for example, an optical transmitter which transmits an optical signal in an optical transmission system, and modulates a data signal into an optical signal with the DQPSK modulation scheme.

This DQPSK modulator 1 includes a transmission data processor 11, first and second driving signal outputting units 12-1 and 12-2, a CW (Continuous Wave) light source 13, a $\pi/2$ phase shifter 14, first and second phase modulators 15-1 and 15-2, and an MZM interferometer 16, which correspond to the reference characters 101 through 106 in the above described FIG. 17, and further includes an optical coupler 17, a power monitor 18, and a feedback controller 19.

Here, the CW light source 13 outputs continuous light and can be formed by a laser diode (LD) or the like. In a case where a wavelength multiplex light transmitting system is applied, the CW light source 13 outputs a wavelength unit of light which is an element subjected to wavelength multiplexing. The MZM interferometer 16 includes: a split waveguide 16a which bifurcates continuous light from the CW light source 13; an I arm waveguide 16i and a Q arm waveguide 16q which propagate the continuous light bifurcated by the split waveguide 16a, respectively; and a combining waveguide 16b which combines optical signals from the I arm waveguide 16i and the Q arm waveguide 16q.

Further, the first phase modulator 15-1 which has a Mach-Zehnder optical waveguide 151a formed on the I arm waveguide 16i and two electrodes 151b formed on the two arm waveguides of the Mach-Zehnder optical waveguide 151a, performs differential binary phase shift keying (BPSK) modulation of input light from the CW light source 13 by means of applying a first driving signal from the second driving signal outputting unit 12-1, which will be described below, through the electrode 151b.

Likewise, the second phase modulator 15-2 has a Mach-Zehnder optical waveguide 152a formed on the Q arm waveguide 16q and two electrodes 152b formed on the two arm waveguides of the Mach-Zehnder optical waveguide 152a, and performs differential binary phase shift keying (BPSK) modulation of input light from the CW light source 13 by means of applying a second driving signal from the second driving signal outputting unit 12-2 described below through the electrode 152b.

Further, the transmission data processor 11, similar to that of FIG. 17 (see reference character 101), outputs two series of data signals (first data and second data), to which have been performed the data processing by a framer, an FEC encoder, and a DQPSK precoder that performs coding processing in which difference information between the current code and the code previous thereto by one bit is reflected to the first driving signal outputting unit 12-1 and the second driving signal outputting unit 12-2.

The first driving signal outputting unit 12-1 differentially amplifies a first data signal at a bit rate of, for example, about 21.5 Gb/s from the transmission data processor 11 and supplies the above described first phase modulator 15-1 with a pair of differential voltage signals inversed to each other as a first driving signal. On the other hand, the second driving signal outputting unit 12-2 differentially amplifies a second data signal at a bit rate of, for example, about 21.5 Gb/s from the transmission data processor 11 and supplies the second phase modulator 15-2 with a pair of differential voltage signals inversed to each other as a second driving signal.

In this instance, these first and second driving signal outputting units 12-1 and 12-2 differ from those (see reference characters 102-1 and 102-2) which have been already described with reference to FIG. 17, and are constructed in such a manner that the eye crossing percentages of the first and the second driving signal as an output differential voltage signal differ from each other.

Here, as shown in FIG. 1, the first driving signal outputting unit 12-1 has a first reference value setting unit 12a which fixedly sets a first reference value and a first differential amplifier 12b which obtains a signal component (that is, a first data signal component) based on the first data from the transmission data processor 11 with the first reference value set by the first reference value setting unit 12a as the center thereof, and differentially amplifies the obtained signal component, thereby outputting a first driving signal to the first phase modulator 15-1 as a differential signal.

Likewise, as shown in FIG. 1, the second driving signal outputting unit 12-2 has a second reference value setting unit 12c which fixedly sets a second reference value and a second differential amplifier 12d which obtains a signal component (that is, a second data signal component) based on the second data from the transmission data processor 11 with the second reference value set by the second reference value setting unit 12c as the center thereof, and differentially amplifies the obtained signal component, thereby outputting a second driving signal to the second phase modulator 15-2 as a differential signal.

Then, the above mentioned first reference value setting unit 12a and the second reference value setting unit 12c set different values as the first reference value and the second reference value, thereby making it possible to make the eye crossing percentages of the first driving signal and the second driving signal differ from each other.

FIG. 2(a) through FIG. 2(c), FIG. 3(a) through FIG. 3(c), and FIG. 4(a) through FIG. 4(c) each are diagrams for describing a capability of setting the eye crossing percentages of the first driving signal and the second driving signal by means of setting the above mentioned first reference value and second reference value. Hereinafter, a description will be made with an attention paid to the first differential amplifier 12b, but the same goes for in the second driving signal output from the second differential amplifier 12d.

Figure 2C:
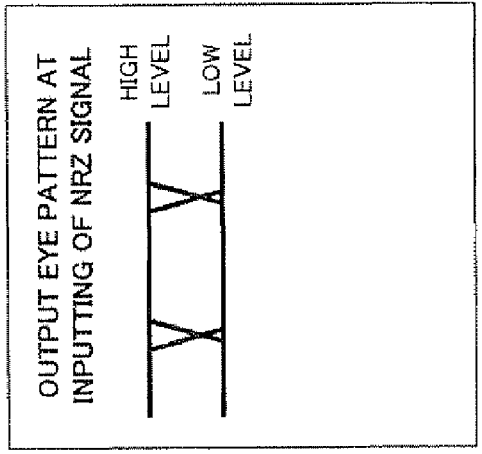
Figure 2B:
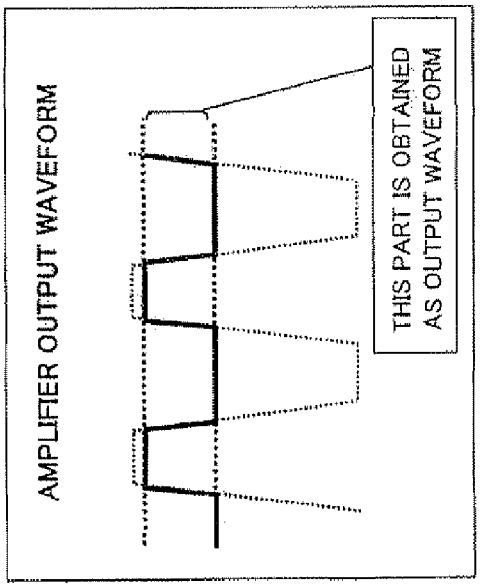
Figure 2A:
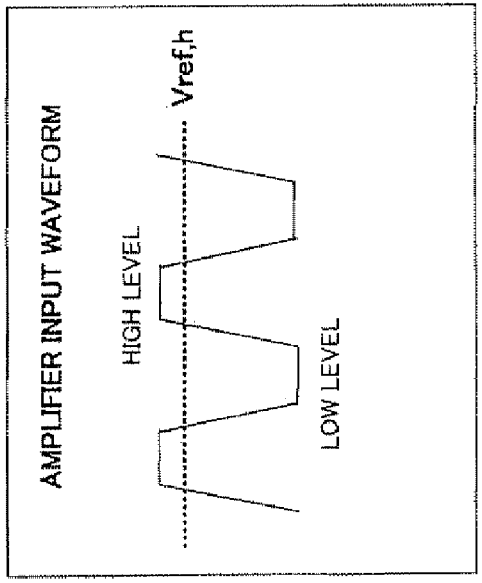

First of all, as shown in FIG. 2(a), by means of making the first reference value input to the first differential amplifier 12b take a value Vrefh higher than the intermediate level of the input first data signal, the first differential amplifier 12b differentially amplifies the first data signal obtained with this value Vrefh as the center thereof [see FIG. 2(b)]. This makes it possible to make the first driving signal output from the first differential amplifier 12b have a eye crossing percentage smaller than 50%. In this instance, in a case where an NRZ signal is input as a data signal, an eye pattern shown in FIG. 2(c) is obtained as a signal whose eye crossing percentage is smaller than 50%.

Figure 3C:
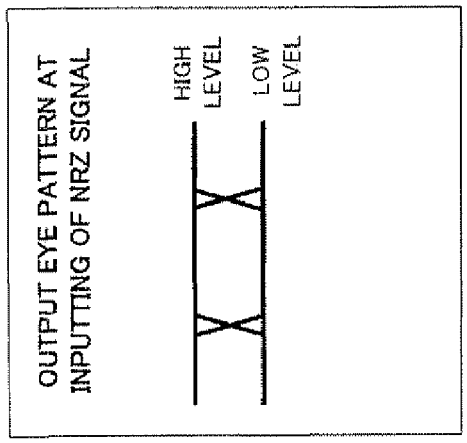
Figure 3B:
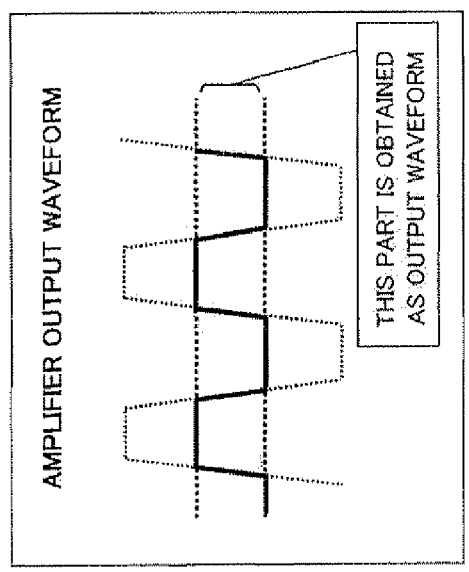
Figure 3A:
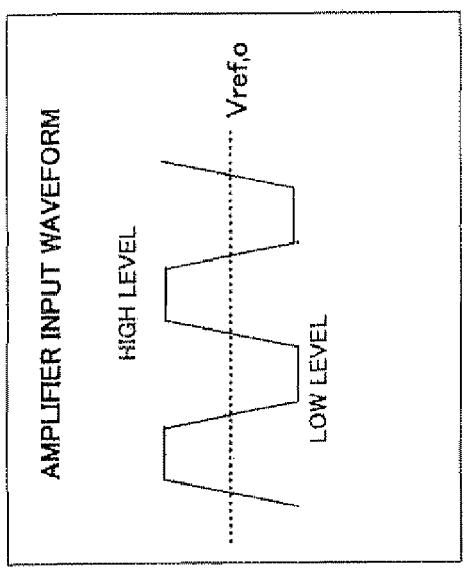

Further, as shown in FIG. 3(a), by means of making the first reference value input to the first differential amplifier 12b take a value Vref0 of about the intermediate level of the input first data signal, the first differential amplifier 12b differentially amplifies the first data signal obtained with this value Vref0 as the center thereof [see FIG. 3(b)]. This makes it possible to make the first driving signal output from the first differential amplifier 12b a signal whose eye crossing percentage is about 50%. In this instance, in a case where an NRZ signal is input as a data signal, an eye pattern shown in FIG. 3(c) is obtained as a signal whose eye crossing percentage is about 50%.

Figure 4C:
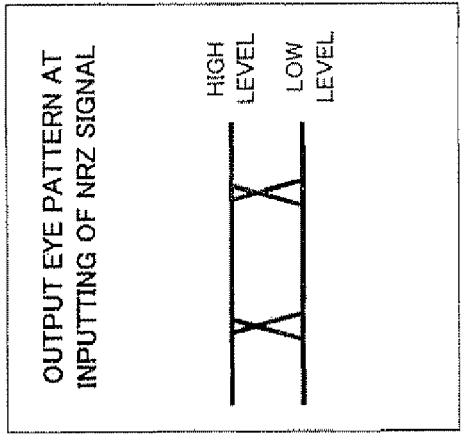
Figure 4B:
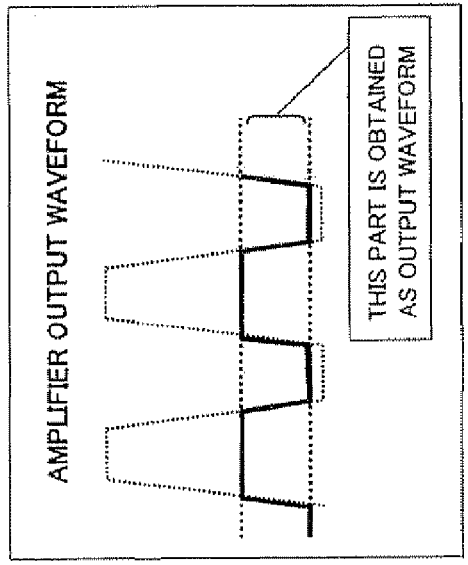
Figure 4A:
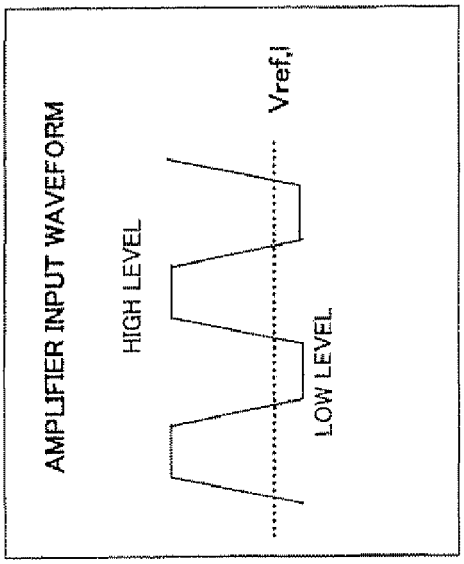

Still further, as shown in FIG. 4(a), by means of making the first reference value input to the first differential amplifier 12b take a value Vref1 lower than the intermediate level of the input first data signal, the first differential amplifier 12b differentially amplifies the first data signal obtained with this value Vref1 as the center thereof [see FIG. 4(b)]. This makes it possible to make the first driving signal output from the first differential amplifier 12b be a signal whose eye crossing percentage is larger than 50%. In this instance, in a case where an NRZ signal is input as a data signal, an eye pattern shown in FIG. 4(c) is obtained as a signal whose eye crossing percentage is larger than 50%.

Accordingly, a first modulator 2-1 which performs differential phase-shift keying modulation of input light with the first driving signal based on the first data is formed of the first driving signal outputting unit 12-1 and the first phase modulator 15-1. Further, a second modulator 2-2 which performs differential phase-shift keying modulation of input light with the second driving signal, which is based on the second data and whose eye crossing percentage differs from that of the first driving signal, is formed of the second driving signal outputting unit 12-2 and the second phase modulator 15-2.

In this instance, the above mentioned CW light source 13 is a continuous light supplier which supplies the first modulator 2-1 and the second modulator 2-2 with continuous light. The first modulator 2-1 and the second modulator 2-2 perform differential phase-shift keying modulation with continuous light from the CW light source 13 as input light, thereby outputting two BPSK modulated optical signals (the first optical signal and the second optical signal).

Further, the π/2 phase shifter 14, which is arranged on the downstream side of the first phase modulator 15-1 and the second phase modulator 15-2 in the I arm waveguide 16i and the Q arm waveguide 16q, is a phase shifter which performs phase shift processing to make the two BPSK modulated signals (the first optical signal and the second optical signal) form a phase difference of π/2 between the two BPSK modulated optical signals output from the first phase modulator 15-1 and the second phase modulator 15-2 in response to control by the feedback controller 19 described below.

For example, electrodes 141 and 142 are provided on the downstream sides of the first phase modulator 15-1 and the second phase modulator 15-2 in the I arm waveguide 16i and the Q arm waveguide 16q, respectively, so that it is possible to make the above-mentioned two optical signals form a phase difference of π/2 with different bias voltages supplied to these electrodes 141 and 142.

In this instance, in FIG. 1, the electrode 141 and the electrode 142, to which bias voltages are supplied, are provided for the I arm waveguide 16i and the Q arm waveguide 16q, respectively. However, the present invention should by no means be limited to this. For example, like in the above described case with reference to FIG. 17, the above-mentioned phase difference can be formed by applying a bias voltage to an electrode provided for either of the I arm waveguide 16i and the Q arm waveguide 16q.

With this structure, the combining waveguide 16b which operates as a combiner combines the first optical signal and the second optical signal, which have been subjected to the phase shift processing, thereby making it possible to output an optical signal which is differential quadrature phase-shift keying modulated (DQPSK modulated). That is, in a case where the first and the second optical signal has a speed of approximately 21.5 Gb/s, the optical signal in the combining waveguide 16b has a speed of 43 Gb/s.

Here, applying driving signals different in eye crossing percentage by the first modulator 2-1 and the second modulator 2-2 make the average light output power of the differential quadrature phase-shift keying modulation output from the combining waveguide 16b change (take a different value) in accordance with the above described phase difference between the component of the first optical signal and that of the second optical signal after being combined by the combining waveguide 16b.

Figure 5A:
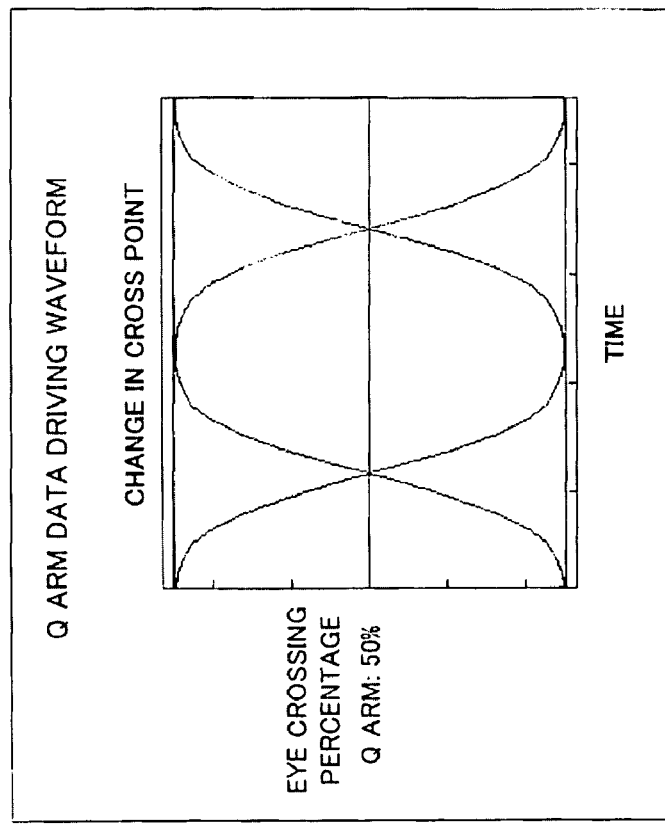
Figure 5B:
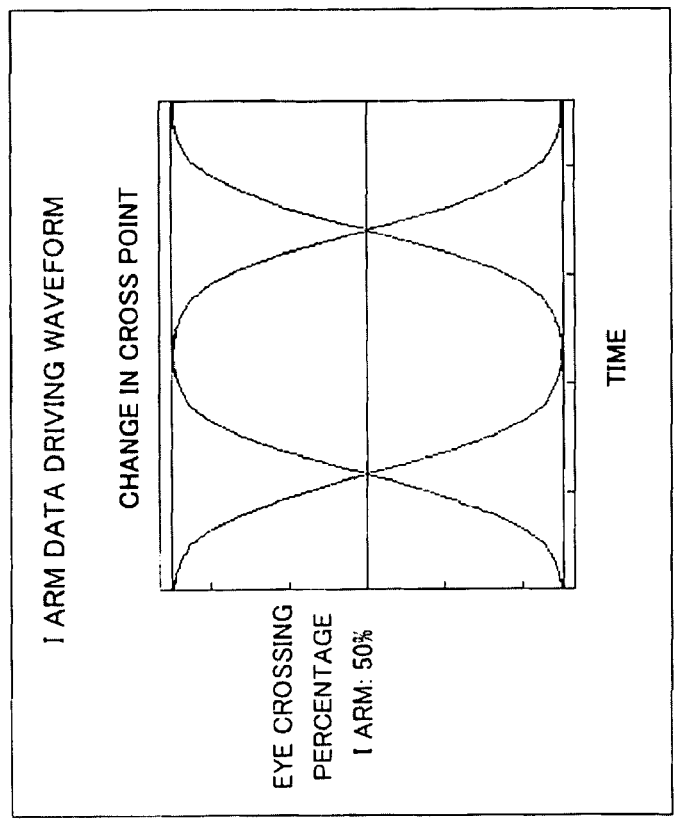

Hereinafter, a review will be made of a case, for example. The case is such that the eye crossing percentage of the first driving signal supplied from the first driving signal outputting unit 12-1, to the first phase modulator 15-1 is 50%, as shown in FIG. 5(a), and the eye crossing percentage of the second driving signal supplied from the second driving signal outputting unit 12-2 to the second phase modulator 15-2 is 50%, equivalent to the eye crossing percentage of the first driving signal, as shown in FIG. 5(b).

In this case, the first reference value set by the first reference value setting unit 12a of the first driving signal outputting unit 12-1 and the second reference value set by the second reference value setting unit 12c of the second driving signal outputting unit 12-2 are levels of approximately to the intermediate level of each data signal [(see FIG. 3(a)].

At that time, as shown by A in FIG. 7, even if the phase difference between the component of the first optical signal and that of the second optical signal fluctuates within a range of 3π/2 through −π/2, an average light output power of the differential quadrature phase-shift keying modulated light output from the combining waveguide 16b never fluctuates.

Figure 6B:
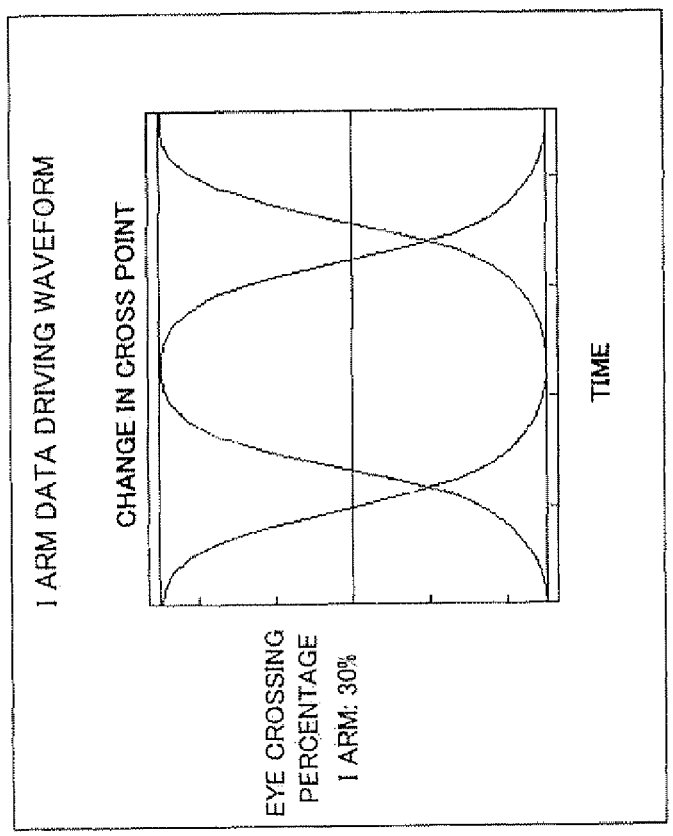
Figure 6A:
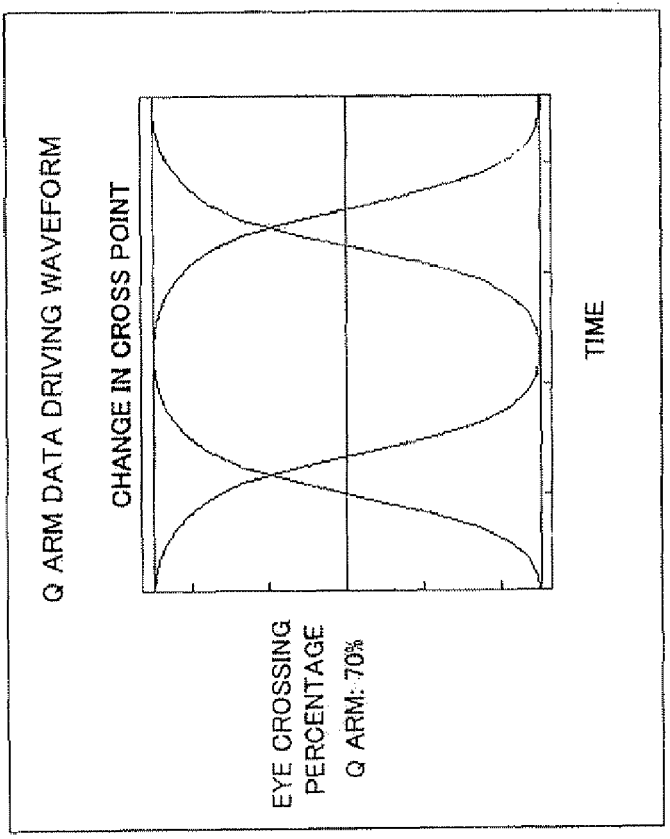

Next, a review will be made hereinafter of a case in which, as shown in FIG. 6(a), for example, the eye crossing percentage of the first driving signal used in modulation of input light by the first modulator 2-1 is 30% and in which, as shown in FIG. 6(b), the eye crossing percentage of the second driving signal used in modulation of input light by the first modulator 2-1 is 70%. In this case, the first reference value set by the first reference value setting unit 12a set by the first reference value setting unit 12a of the first driving signal outputting unit 12-1 is at a level larger than the intermediate level of the first data signal [see FIG. 2(a)]; the second reference value set by the second reference value setting unit 12c of the second driving signal outputting unit 12-2 is at a level lower than the intermediate level of the second data signal [see FIG. 4(a)].

At that time, as indicated by B in FIG. 7, when the phase difference between the component of the first optical signal and that of the second optical signal is made to be varied within a range of 3π/2 through −π/2, an average light output power of the differential quadrature phase-shift keying modulated light output from the combining waveguide 16b changes. In this case, the average light output power shows a trajectory change like a sign wave within a range of the phase difference of 3π/2 through −π/2.

Here, in FIG. 7, the average light output power is shown as a relative value normalized to the light output power in a case where both of the eye crossing percentages of the first driving signal and the second driving signal are 50% (without difference therebetween) is shown with regulation.

As a result, the inventors of the present invention found the following characteristic feature in a case where these driving signals are different in eye crossing percentage: change in the average light output power in accordance with the above-mentioned phase difference shows a linear change in value, in particular, at the periphery in which the phase difference is π/2, while more non-linear value changes are shown as the phase difference separates from π/2 such as a peripheries where the phase difference is, for example, π or 0.

In the present embodiment, the average light output power of output light from the combining waveguide 16b is monitored by using the relationship between a phase difference and an average light output power, which is caused by setting of different eye crossing percentages in the first and the second driving voltage signal, and feedback control of a bias voltage supplied to the π/2 phase shifter 14 in accordance with the monitoring result is performed.

That is, it is possible to obtain a phase difference between the component of the first optical signal and that of the second optical signal after being combined by the combining waveguide 16b, from the monitoring result of an average light output power, and also to perform feedback control of a bias voltage in the π/2 phase shifter 14 in such a manner that the phase difference becomes π/2 (or, at least, the phase difference can stay within a range of alienation from π/2 that can be allowable as transmission signal quality).

Thus, as shown in FIG. 1, the DQPSK modulator 1 of the present embodiment includes: an optical coupler 17 which splits a part of DQPSK modulated light output from the combining waveguide 16b; a power monitor 18 which monitors an average light output power of the DQPSK modulated light split by the optical coupler 17; and a feedback controller 19 which functions as a phase shift controller that performs feedback control of the phase shift amount in the π/2 phase shifter 14 based on the average light output power monitored by the power monitor 18.

Here, the power monitor 18 includes: a photodiode (PD) 18a which functions as an opto-electric element that outputs an electric current signal in accordance with an average power value of the DQPSK modulated light from the optical coupler 17; and a current/voltage (I/V) converter 18b which converts the electric current signal from the photodiode 18a into a voltage signal. In this instance, in a case where an opto-electric element having a function of outputting a voltage signal is applied, a function as the current/voltage converter 18b can be appropriately omitted.

Further, in the present embodiment, as far as an average light output power of the DQPSK modulated light can be obtained as the monitoring result in the power monitor 18, it is unnecessary to monitor change of light output power for each modulated symbol. Thus, it is unnecessary to use a two-photon absorption detecting element or a fast linear photo diode, used in the above described patent document 2, and it is thus possible to use a photo diode whose response speed is significantly slower than the bit rates of the first and second data signals from the transmission data processor 11.

Furthermore, the feedback controller 19 controls a bias voltage to the π/2 phase shifter 14 based on the monitoring result of the average optical output power as already described above. At that time, since the amount of change in the average light output power of the DQPSK modulated light in accordance with the phase difference between the first optical signal from the I arm waveguide 16i and the second optical signal from the Q arm waveguide 16q is sufficiently small in comparison with the level of the average light output power itself, it is assumed that controlling a bias voltage based on an absolute average light output power will makes it difficult to improve the accuracy of feedback control of the phase difference.

Hence, the feedback controller 19 of the present embodiment is capable of setting a target control point of feedback control with an accuracy higher than that of dithering by using the following characteristic feature of change in the average light output power in accordance with the phase difference: a linear value change is exhibited in the periphery of a phase difference of π/2 while more non-linear value change is exhibited as the phase difference separates from π/2.

To realize the above, as shown in FIG. 8, the feedback controller 19 has a low-frequency signal generator 191, a bias supplier 192, a lock-in amplifier 193, and a bias controller 194. In this instance, in FIG. 8, the transmission data processor 11 is omitted from the illustration thereof.

Here, the low-frequency signal generator 191 generates a low-frequency signal (frequency f0). The bias supplier 192 sets a phase control voltage signal for phase shift processing performed by the π/2 phase shifter 14. The bias supplier 192 also superimposes a low-frequency signal from the low-frequency signal generator 191 to a phase control voltage signal, and supplies the thus obtained signal to the π/2 phase shifter 14 as a bias voltage signal. According to the present embodiment, the bias supplier 192 has a first supplier 192a which supplies a bias voltage signal to the electrode 141 on the I arm waveguide 16i and also a second supplier 192b which supplies a bias voltage signal to the electrode 142 on the Q arm waveguide 16q.

That is, the phase of the first optical signal from the I arm waveguide 16i is controlled by the bias voltage signal supplied from the first supplier 192a to the electrode 141, and the phase of the second optical signal from the Q arm waveguide 16q is controlled by the bias voltage signal supplied from the second supplier 192b to the electrode 142. Since each of the bias voltage signals is superimposed with a low-frequency signal f0, the phase shift amounts of the first and second signal components output from the π/2 phase shifter 14 change in accordance with the low-frequency signal f0.

That is, although a bias voltage signal of a fixed voltage is supplied to the π/2 phase shifter 104 in the case of the above described FIG. 17, a bias voltage signal supplied to the π/2 phase shifter 14 minutely changes with the low-frequency f0. As shown in the above described FIG. 18, since the amount of a bias voltage and the phase shift amount have a linear relationship therebetween, the phase shift amounts of the first and second optical signals also minutely change with the low-frequency f0 in accordance with a bias voltage signal.

According to the present embodiment, as shown by B in FIG. 7, the average light output power of the DQPSK modulated light from the combining waveguide 16b changes in accordance with a phase difference between the first optical signal component and the second optical signal component combined by the combining waveguide 16b. Thus, changing the phase shift amounts of the components of the first and second optical signals by the π/2 phase shifter 14 with the low-frequency signal as described above results in that a frequency component derived from this frequency f0 is contained in also the average light output power of the DQPSK modulated light from the combining waveguide 16b.

In this instance, the low-frequency signals supplied from the low-frequency signal generator 191 to the first and the second supplier 192a and 192b are shifted from each other in phase by 180°.

Further, this low frequency signal f0 has an amplitude value sufficiently smaller than (for example, approximately 1/100 of) those of the phase control voltage signals of the first supplier 192a and the second supplier 192b. In addition, the frequency f0 may be a low-frequency signal (for example, several kHz) which can be adequately observed by means of monitoring an average light output power in the photodiode 18a.

Further, the lock-in amplifier 193 has a function as a frequency component extracting unit which extracts a frequency component derived from the low-frequency signal f0, which frequency component is contained in an average output power monitored by the power monitor 18. More precisely, the lock-in amplifier 193 is input thereto with a monitor signal (voltage signal) of the average light output power from the power monitor 18 and also with the low-frequency signal f0 from the low-frequency signal generator 191 as a reference signal, and extracts a frequency component of a low frequency f0 contained in a monitor signal from the power monitor 18.

In this instance, according to the present embodiment, although the lock-in amplifier 193 extracts a frequency component f0 of the low-frequency signal from the low-frequency signal generator 191, a frequency component 2f0, which is the second harmonic frequency of the low-frequency signal, can also be extracted. In this case, a frequency converting circuit 195, which converts a low-frequency signal from the low-frequency signal generator 191 into a signal having a frequency component of the second harmonic frequency of the low-frequency signal and supplies the converted signal as a reference signal in the lock-in amplifier 193, appropriately interposed between the low-frequency signal generator 191 and the lock-in amplifier 193.

The bias controller 194 controls a phase control voltage signal set by the bias supplier 192 based on a component of the frequency f0 extracted by the lock-in amplifier 193. More precisely, the bias controller 194 controls a phase control voltage signal set by the bias supplier 192 in such a manner that a component of the frequency f0 from the lock-in amplifier 193 becomes maximal.

FIG. 9 is a diagram showing change in a component of the frequency f0 from a lock-in amplifier 193 in accordance with the phase shift amount in the π/2 phase shifter 14, that is, a phase difference between the first optical signal and the second optical signal combined by the combining waveguide 16b. As shown in FIG. 9, at the time the phase shift amount in the π/2 phase shifter is π/2, a component of the frequency f0 extracted by the lock-in amplifier 193 becomes maximal. Hence, the bias controller 194 controls a phase control voltage signal in such a manner that a component of the frequency f0 extracted by the lock-in amplifier 193 becomes maximal, thereby making it possible to make the phase shift amount take an appropriate value in the π/2 phase shifter 14.

On the other hand, in a case where the lock-in amplifier 193 is constructed so as to extract a frequency 2f0, the second harmonic frequency of f0, superimposed as a bias voltage signal in the lock-in amplifier 193, a phase control voltage signal set by the bias supplier 192 is controlled in such a manner that this frequency 2f0 component becomes minimal.

FIG. 10 is a diagram indicating change in a frequency 2f0 component from the lock-in amplifier 193 in accordance with the phase shift amount in the π/2 phase shifter 14, that is, a phase difference between the first optical signal and the second optical signal combined by the combining waveguide 16b. As indicated in FIG. 10, when the phase shift amount in the π/2 phase shifter 14 is π/2, a component of the frequency 2f0 extracted by the lock-in amplifier 193 is minimal. Accordingly, the bias controller 194 is capable of controlling the phase control voltage signal in such a manner that a component of the frequency 2f0 extracted by the lock-in amplifier 193 becomes minimal, thereby making it possible for the phase shift amount in the π/2 phase shifter 14 to take an appropriate value.

FIG. 11 through FIG. 14 each are diagrams for describing a fact that a frequency f0 component or a frequency 2f0 component contained in the above described average light output power changes in accordance with the phase shift amount in the π/2 phase shifter 14, that is, a phase difference between the first and second optical signals combined by the combining waveguide 16b as described in the above described FIG. 9 and FIG. 10.

As already described, since the component of a frequency f0 superimposed to the bias voltage signal to the π/2 phase shifter 14 is mapped to the phase shift amount as it is, the phase difference also changes with the frequency f0.

At that time, in a range in which the phase shift amount in the π/2 phase shifter 14 is approximately π/2 as indicated by B in FIG. 11, the average light output power changes in a linear manner with respect to the phase difference. Accordingly, the frequency f0 superimposed to the bias voltage signal appears, as it is, in the average light output power monitored by the power monitor 18 and changes.

On the other hand, as indicated by A in FIG. 11, when the phase shift amount in the π/2 phase shifter 14 is larger than π/2 and separates from the linear change range as indicated by B in FIG. 11 and shown in FIG. 13, an average light output power changes in a non-linear manner with respect to a phase difference. As a result, as to a change component of the average light output power monitored by the power monitor 18, the component of frequency f0 superimposed to a bias voltage signal is decreased, and a second harmonic frequency component of the frequency f0, which is a distortion component, is generated.

Likewise, as indicated by C in FIG. 11, when the phase shift amount in the π/2 phase shifter 14 is smaller than π/2 and separates from the linear change range as indicated by B in FIG. 11 and shown in FIG. 13, the power change becomes non-linear with respect to a phase difference as shown in FIG. 14. As a result, as to a change component of the average light output power monitored by the power monitor 18, the component of frequency f0 superimposed to a bias voltage signal is decreased, and a second harmonic frequency component of the frequency f0, which is a distortion component, is generated.

Accordingly, in a case where the phase shift amount in the π/2 phase shifter 14 stays in an appropriate range (a linear change range containing the state of π/2; see FIG. 13), as to a change component of the average light output power, an f0 component becomes maximal as shown in FIG. 9, while a 2f0 component, which is a distortion component, becomes minimal as shown in FIG. 10.

In the differential quadrature phase shift keying modulator 1 with the above described structure, the first modulator 2-1 outputs a first optical signal, which is obtained by differential binary phase-shift keying modulation of input light from the CW light source 13, by means of applying a first driving signal in the first modulator 2-1, and outputs a second optical signal, which is obtained by differential binary phase-shift keying modulation of input light from the CW light source 13, by means of applying a second driving signal in the second modulator 2-2.

Then, the π/2 phase shifter 14 performs phase shift processing in such a manner that the above first optical signal and the second optical signal form a phase difference of π/2, and the combining waveguide 16b combines the above first optical signal and the second optical signal, which have been subjected to phase shift processing by the π/2 phase shifter 14, and outputs the thus obtained combined optical signal as differential quadrature phase-shift keying modulated light.

At that time, the first driving signal outputting unit 12-1 and the second driving signal outputting unit 12-2 change the average light output power of the differential quadrature phase-shift keying modulated light output from the combining waveguide 16b in accordance with a phase difference between the first optical signal and the second optical signal formed by the phase shift processing by manes of using driving signals different in eye crossing percentage in the first modulator 2-1 and the second modulator 2-2.

Then, the power monitor 18 is input thereto with a part of DQPSK modulated light output from the combining waveguide 16b through an optical coupler 17, and the average light output power of the differential quadrature phase-shift keying modulated light output from the combining waveguide 16b is monitored.

The feedback controller 19 is capable of performing feedback control of the phase shift amount in the phase shift unit by using the characteristic feature of change in the average light output power in accordance with the above-mentioned phase difference, based on the monitored average light output power. That is, the feedback controller 19 feedbacks the phase control voltage signal forming a bias voltage signal to the π/2 phase shifter 14 in such a manner that the frequency component f0, which is generated by the low-frequency signal generator 191 and superimposed as a bias voltage signal, becomes maximal or that the frequency component 2f0, second harmonic of the frequency component f0, becomes minimal, thereby executing variable control.

In this manner, according to the present embodiment, since the feedback controller 19 is capable of performing feedback control of the phase shift amount in the phase shifter based on the average light output power monitored by the power monitor 18, there is an advantage that the DQPSK modulator 1 is capable of realizing feedback control of the phase shift amount which realizes an appropriate phase difference between the combined two differential phase-shift keying modulated light components, which operates as differential quadrature phase-shift keying modulated light, while applying an inexpensive opto-electric conversion element whose response speed is significantly lower than the bit rate.

[a2] Modified Example of One Preferred Embodiment of the Present Invention

FIG. 15 is a diagram showing a modified example of one preferred embodiment of the present invention, and illustrates a modified example of the first driving signal outputting unit 12-1 and the second driving signal outputting unit 12-2 in the embodiment shown in FIG. 1. That is, in each of the first driving signal outputting unit 12-1 and the second driving signal outputting unit 12-2, the first reference value setting unit 12a and the second reference value setting unit 12c shown in FIG. 1 set the first and the second reference value, respectively, in a fixed manner. The driving signal outputting unit 12A shown in FIG. 15, however, has a structure that performs feedback control for stabilizing the reference value (the first or the second reference value).

That is, the driving signal outputting unit 12A shown in FIG. 15 has a reference value setting unit 12Aa as well as a differential amplifier 12Ab similar to that in the above case described with reference to FIG. 1 (reference character 12b or 12d).

Here, the reference value setting unit 12Aa includes: splitter circuits 121 and 122 which split a pair of differential signals from the differential amplifier 12Ab; average value circuits 123 and 124 which calculate an average value of the differential signals from the splitter circuits 121 and 122; and a control circuit 125 which performs feedback control of a reference value (the first or the second reference value) to the differential amplifier 12Ab based on the outputs of the average value circuits 123 and 124.

That is, in a case where the driving signal outputting unit 12A shown in FIG. 15 is applied in place of the first driving signal outputting unit 12-1 shown in FIG. 1, the reference value setting unit 12Aa is formed by the splitter circuits 121 and 122, the average value circuits 123 and 124, and the control circuit 125. The average value circuits 123 and 124 operate as a first average value circuit which calculates the average value of the first driving signal output from the first differential amplifier 12Ab, and the control circuit 125 operates as a first control circuit which controls setting of the first reference value based on the calculation result in the first average value circuits 123 and 124 in such a manner that the first driving signal is stabilized to have a predetermined eye crossing percentage.

Likewise, in a case where the driving signal outputting unit 12A shown in FIG. 15 is applied in place of the second driving signal outputting unit 12-2 shown in FIG. 1, the reference value setting unit 12Aa is formed by the splitter circuits 121 and 122, the average value circuits 123 and 124, and the control circuit 125. The average value circuits 123 and 124 operate as a second average value circuit which calculates the average value of the second driving signal output from the second differential amplifier 12Ab, and the control circuit 125 operates as a second control circuit which controls setting of the second reference value based on the calculation result in the second average value circuits 123 and 124 in such a manner that the second driving signal is stabilized to have a predetermined eye crossing percentage.

In a data signal, the number of high-level signals and the number of low-level signals are normally equalized by scramble processing, and thus, as shown in FIG. 16, output values of the average value circuits 123 and 124 are in proportion to the eye crossing percentage.

That is, since the driving signal output from the differential amplifier 12Ab as a differential signal has a relationship such that the average value of the driving signal becomes larger in proportion to the eye crossing percentage, the control circuit 124 performs feedback control of the reference value based on the calculation result of the differential signal average value from the average value circuits 123 and 124, thereby making the eye crossing percentage of an output from the differential amplifier 12Ab be stabilized into an expected setting thereof. For example, as indicated by B of the above described FIG. 7, the eye crossing percentage can be stabilized to be 30% in the first modulator 2-1 and 70% in the second modulator 2-2.

The mode of such change in the average light output power in accordance with the phase difference between the first optical signal and the second optical signal as shown in FIG. 7 is considered to depend upon setting of the eye crossing percentage. Hence, setting of the eye crossing percentage of the driving signals used in the first modulator 2-1 and the second modulator 2-2 needs to be also stabilized.

Accordingly, application of the driving signal outputting unit 12A of FIG. 5 in place of the first driving signal outputting unit 12-1 and the second driving signal outputting unit 12-2 shown in FIG. 1, makes it possible to stabilize setting of the eye crossing percentages of the driving signals in the first modulator 2-1 and the second modulator 2-2, so that it becomes also possible to stabilize change in the average output power shown in FIG. 7 to have a desired characteristic feature. Therefore, it can be expected that the accuracy of phase shift control in the $\pi/2$ phase shifter 14 be improved.

[b] Others

Further, the present invention should by no means be limited to the above-illustrated embodiment, and various changes or modifications may be suggested without departing from the gist of the invention.

In addition, the above disclosure of one preferred embodiment of the present invention makes it possible to manufacture an apparatus of the present invention.

What is claimed is:

1. A quadrature phase shift keying modulator comprising:
a first modulator which performs phase-shift keying modulation of input light with a first driving signal that is based on first data;
a second modulator which performs phase-shift keying modulation of input light with a second driving signal that is a driving signal based on second data and is different from the first driving signal in eye crossing percentage;
a phase shifting unit which performs phase shift processing in such a manner that a second optical signal, which is phase-shift keying modulated with a first optical signal being phase-shift keying modulated by said first modulator, and a second optical signal, which is phase-shift keying modulated by said second modulator, form a phase difference of $\pi/2$ therebetween; and
a combining unit which combines the first optical signal and the second optical signal, which are subjected to the phase shift processing performed by said phase shifting unit, and hereby outputs quadrature phase-shift keying modulated light,
said quadrature phase shift keying modulator being constructed in such a manner that an average light output power of the quadrature phase-shift keying modulation light output from said combining unit changes in accordance with a phase difference between a component of the first optical signal and a component of the second optical signal after being combined by said combining unit by means of applying driving signals different in eye crossing percentage by said first modulator and said second modulator, respectively, said quadrature phase shift keying modulator further comprising:

a power monitor which monitors an average light output power of the quadrature phase-shift keying modulation light output from said combining unit; and a phase shift controlling unit which performs feedback control of the phase shift amount in said phase shifting unit based on the average light output power monitored by said power monitor.

2. The quadrature phase shift keying modulator as set forth in claim 1, wherein said phase shift controlling unit includes:

a low-frequency signal generating unit which generates a low-frequency signal;

a bias supplying unit which sets a phase control voltage signal for use in the phase shift processing performed by said phase shifting unit and superimposes the low-frequency signal generated by said low-frequency signal generating unit to the phase control voltage signal and supplies said phase shifting unit with the resultantly obtained signal as the bias voltage signal;

a frequency component extracting unit which extracts a frequency component derived from the low-frequency signal in the bias signal, which frequency component is contained in the average light output power monitored by said power monitor; and a bias controlling unit which controls the phase control voltage signal set by said bias supplying unit based on the frequency component extracted by said frequency component extracting unit.

3. The quadrature phase shift keying modulator as set forth in claim 2, wherein the eye crossing percentage of each of the driving signals in said first modulator and said second modulator is set in such a manner that a frequency component of the low-frequency signal, which is a frequency component derived from the low-frequency signal contained in the average light output power, increases as a phase difference between the first optical signal and the second optical signal approaches to $\pi/2$, wherein said frequency component extracting unit extracts a frequency component of the low-frequency signal as a frequency component derived from the low-frequency signal contained in the bias signal, and wherein said bias controlling unit controls the phase control voltage signal in such a manner that the frequency component of the low-frequency-signal extracted by said frequency component extracting unit becomes maximal.

4. The quadrature phase shift keying modulator as set forth in claim 2, wherein the eye crossing percentage of each of the driving signals in said first modulator and said second modulator is set in such a manner that a frequency component of a second harmonic frequency of the low-frequency signal, which is a frequency component derived from the low-frequency signal contained in the average light output power, decreases as a phase difference between the first optical signal and the second optical signal approaches to $\pi/2$, wherein said frequency component extracting unit extracts a frequency component of the second harmonic frequency of the low-frequency signal as a frequency component derived from the low-frequency signal contained in the bias signal, and wherein said phase control voltage controlling unit controls the phase control voltage signal in such a manner that a frequency component of the second harmonic frequency of the low-frequency signal extracted by said frequency component extracting unit becomes minimal.

5. The quadrature phase shift keying modulator as set forth in claim 1, further comprising: a continuous light supplying unit which supplies said first modulator and said second modulator with continuous light, said first and second modulators each performing the differential phase modulation with the continuous light from said continuous light supplying unit as the input light and hereby outputting the first and the second optical signal.

6. The quadrature phase shift keying modulator as set forth in claim 1, wherein said first modulator includes:

a first driving signal outputting unit which outputs the first driving signal; and a first phase modulating unit which performs phase-shift keying modulation of the input light by means of applying the first driving signal from said first driving signal outputting unit, and wherein said second modulator includes:

a second driving signal outputting unit which outputs the second driving signal; and a second phase modulating unit which performs phase-shift keying modulation of the input light by means of applying the second driving signal from said second driving signal outputting unit.

7. The quadrature phase shift keying modulator as set forth in claim 6, wherein said first driving signal outputting unit includes:

a first reference value setting unit which sets a first reference value; and a first differential amplifier which obtains a signal component based on the first data with the first reference value as the center thereof and performs differential amplification of the obtained signal component and hereby outputs the first driving signal as a differential signal, wherein said second driving signal outputting unit includes:

a second reference value setting unit which sets a second reference value; and a second differential amplifier which obtains a signal component based on the second data with the second reference value as the center thereof, and performs differential amplification of the signal component having been obtained, and hereby outputs the second driving signal as a differential signal, and wherein said first and second reference value setting units set the first reference value and the second reference value so as to be different from each other.

8. The quadrature phase shift keying modulator as set forth in claim 7, wherein said first reference value setting unit includes:

a first average value circuit which calculates an average value of the first driving signal output from said first differential amplifier; and a first control circuit which performs setting control of the first reference value in such a manner that the first driving signal is stabilized to have a predetermined eye crossing percentage based on a calculation result obtained by said first average value circuit, and wherein said second reference value setting unit includes:

a second average value circuit which calculates an average value of the second driving signal output from said second differential amplifier; and a second control circuit which performs setting control of the second reference value in such a manner that the first driving signal is stabilized to have a predetermined eye crossing percentage, which is different from that of the first driving signal, based on a calculation result obtained by said second average value circuit.

9. The quadrature phase shift keying modulator asset forth in claim 1, wherein said power monitor includes an opto-electric conversion element whose response speed is significantly lower than the bit rate of the first or the second data.

10. A phase shift amount controlling method for a quadrature phase-shift keying modulator including: a first modulator which is operable to output a first optical signal obtained by means of phase-shift keying modulation of input light with application of a first driving signal thereto; a second modulator which is operable to output a second optical signal obtained by means of phase-shift keying modulation of input light with application of a second driving signal thereto; a phase shifting unit which performs phase shift processing in such a manner that the first optical signal and the second optical signal form a phase difference of $\pi/2$ therebetween; and a combining unit which combines the first optical signal and the second optical signal, which are subjected to the phase shift processing performed by said phase shifting unit and hereby outputs quadrature phase-shift keying modulation light, said method comprising:

applying driving signals different in eye crossing percentage by said first modulator and said second modulator, respectively, and hereby changing an average light output power of phase-shift keying modulation light output from said combining unit in accordance with a phase difference between the first optical signal and the second optical signal formed by the phase shift processing;

monitoring an average light output power of the phase-shift keying modulation light output from said combining unit; and performing feedback control of the phase shift amount in said phase shifting unit based on the monitored average light output power.

* * * * *

UNITED STATES PATENT AND TRADEMARK OFFICE
CERTIFICATE OF CORRECTION

| | |
|---|---|
| PATENT NO. | : 7,603,007 B2 |
| APPLICATION NO. | : 12/234931 |
| DATED | : October 13, 2009 |
| INVENTOR(S) | : Takafumi Terahara et al. |

It is certified that error appears in the above-identified patent and that said Letters Patent is hereby corrected as shown below:

Column 19, Line 53, claim 3 change "frequency-signal" to --frequency signal--.

Column 21, Line 13, claim 8 change "asset" to --as set--.

Signed and Sealed this

Fifth Day of January, 2010

David J. Kappos
*Director of the United States Patent and Trademark Office*